United States Patent
Kato et al.

(10) Patent No.: US 9,350,462 B2
(45) Date of Patent: May 24, 2016

(54) FIELD COUPLING ELECTRODE, COMMUNICATION DEVICE, AND COMMUNICATION SYSTEM

(71) Applicant: SONY CORPORATION, Tokyo (JP)

(72) Inventors: Yoshihiro Kato, Kanagawa (JP); Koichi Ito, Tokyo (JP); Noriyuki Mukai, Tokyo (JP); Masaya Takano, Tokyo (JP); Takeshi Maeda, Tokyo (JP); Seigo Fukunaga, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/441,651

(22) PCT Filed: Oct. 18, 2013

(86) PCT No.: PCT/JP2013/078375
§ 371 (c)(1),
(2) Date: May 8, 2015

(87) PCT Pub. No.: WO2014/087748
PCT Pub. Date: Jun. 12, 2014

(65) Prior Publication Data
US 2015/0280838 A1    Oct. 1, 2015

(30) Foreign Application Priority Data

Dec. 4, 2012  (JP) ................. 2012-265820

(51) Int. Cl.
*H04B 5/00* (2006.01)
*H04B 13/00* (2006.01)
*H04W 4/00* (2009.01)

(52) U.S. Cl.
CPC ............ *H04B 13/005* (2013.01); *H04B 5/0012* (2013.01); *H04W 4/008* (2013.01)

(58) Field of Classification Search
CPC ...... H04L 27/04; H04B 5/0012; H04W 4/008
USPC ..................................................... 455/41.1
See application file for complete search history.

(56) References Cited

U.S. PATENT DOCUMENTS

2004/0209581 A1* 10/2004 Mizoguchi ........... H04B 1/0057
455/127.4
2005/0248288 A1* 11/2005 Chou .................. H05B 41/2822
315/209 PZ

* cited by examiner

*Primary Examiner* — Eugene Yun
(74) *Attorney, Agent, or Firm* — Paratus Law Group, PLLC

(57) ABSTRACT

This specification discloses an excellent communication device of a field coupling type that increases field coupling efficiency between electrodes and realizes a small-sized device. This specification also discloses a communication system and an electrode. A communication device 100 includes: a first resonant circuit 121 connected in series to an electrode unit 110 formed with two conductor plates; and a second resonant circuit 122 connected in parallel to the electrode unit 110 and the first resonant circuit 121, which are connected in series. The constant of a resonant circuit is determined so that the voltage V2 to be applied to the electrode unit 110 becomes higher than the voltage V1 to be applied to the electrode unit 110 and the first resonant circuit 121 connected in series. In this manner, a field coupling electrode that has a very high coupling strength at a target frequency is obtained.

7 Claims, 42 Drawing Sheets

FIG. 40
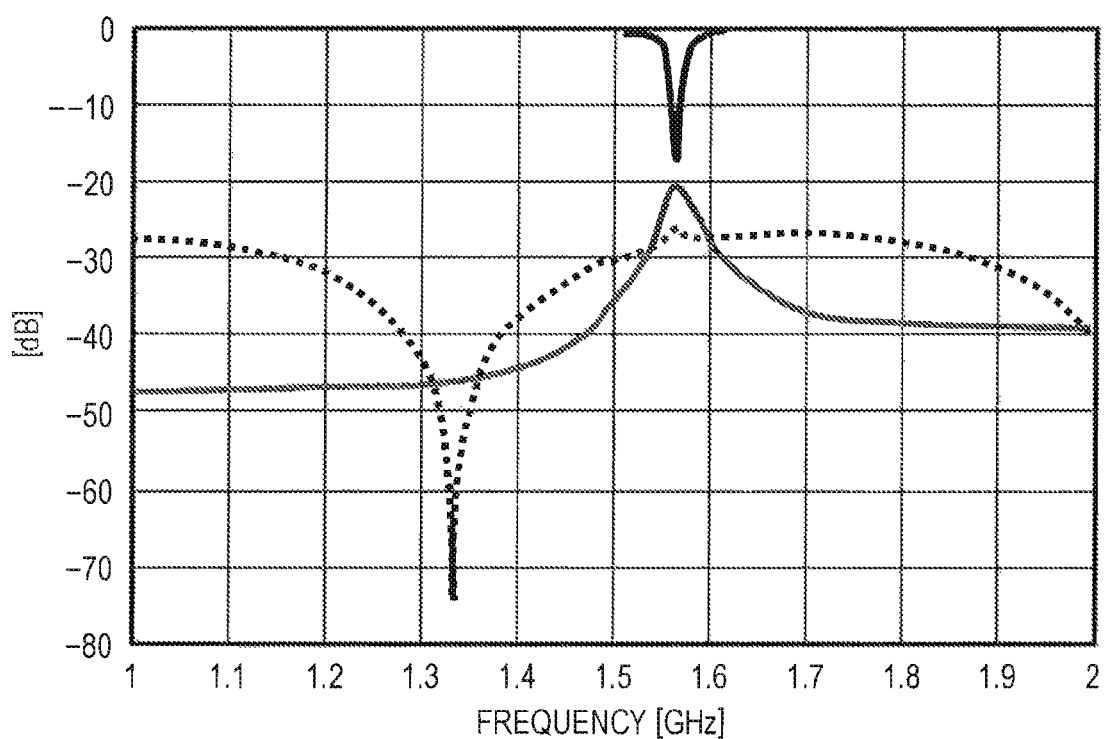
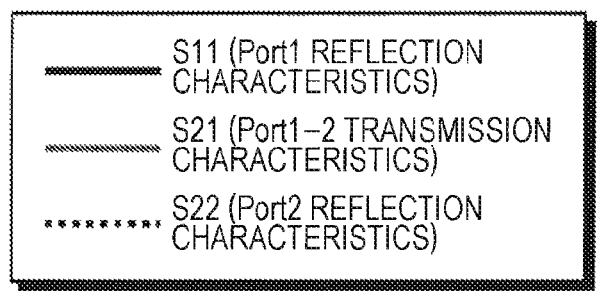

FIELD COUPLING ELECTRODE, COMMUNICATION DEVICE, AND COMMUNICATION SYSTEM

CROSS REFERENCE TO PRIOR APPLICATION

This application is a National Stage Patent Application of PCT International Patent Application No. PCT/JP2013/078375 (filed on Oct. 18, 2013) under 35 U.S.C. §371, which claims priority to Japanese Patent Application No. 2012-265820 (filed on Dec. 4, 2012), which are all hereby incorporated by reference in their entirety.

TECHNICAL FIELD

The technology disclosed in this specification relates to a field coupling electrode that is used in intra-body communication, non-contact communication, wireless power transmission, or the like, a communication device and a communication system that perform intra-body communication, non-contact communication, wireless power transmission, or the like, and electrodes that are used in intra-body communication, non-contact communication, wireless power transmission, or the like.

BACKGROUND ART

Development is currently underway for communication systems that perform wireless data transmission over short distances, such as intra-body communication and non-contact communication. Characteristically, a communication system of this type is capable of conducting wireless communication in a simple manner, and has a very low risk of being intercepted, for example.

Particularly, in intra-body communication, a human body is used as a communication path medium, and accordingly, communication can be conducted with an easy-to-understand interface that is to be touched by a user. Also, intra-body communication is designed for communication in the vicinity of a human body. Therefore, there is no need to transmit radio waves over a long distance, while there is the advantage that power consumption is low.

Conventional intra-body communication is roughly classified into two methods: an electric current method for transmitting a current signal in a human body, and an electric field method for transmitting a signal by applying an electric field to a human body. By the former electric current method, a human body needs to be in contact with the respective electrodes of a transmitter and a receiver. Therefore, there are drawbacks that the user feels uncomfortable, and communication becomes unstable when the contact state between the skin and the electrodes changes due to perspiration or the like. In the case of the latter electric field method, even when a human body is not in contact with the electrodes of the transmitter and the receiver, an electric field can be applied to the human body, and communication can be conducted. Accordingly, this method has a wider range of application.

For example, there is a suggested intra-body communication system in which electric fields are generated almost only between the electrodes of a first communication device and a second communication device, and the possibility that intra-body communication will be started against the user's will is lowered (see Patent Document 1, for example).

There is also a suggested intra-body communication system in which an electronic device has a human-body electrode and an external electrode, and the impedance between the human-body electrode and the external electrode is maximized at the frequency to be used for field coupling. This intra-body communication system is hardly affected by static electricity even when electrostatically charged, and can maintain satisfactory performance (see Patent Document 2, for example).

The applicant is of the opinion that, so as to further improve quality in an intra-body communication system of the electric field type, field coupling needs to be realized with higher efficiency even when a human body is interposed between the electrodes of the transmitter and the receiver. Also, where field coupling between electrodes via a human body is stronger, there is the advantage that the electrodes of the transmitter and the receiver can be made smaller in size.

The idea that high-efficiency field coupling is required and devices can be made smaller in size by making field coupling stronger applies not only to intra-body communication but also to non-contact communication systems and wireless power transmission systems of the field coupling type.

SUMMARY OF THE INVENTION

Problems to be Solved by the Invention

The technology disclosed in this specification aims to provide an excellent field coupling electrode that can be suitably used in intra-body communication, non-contact communication, wireless power transmission, or the like, and an excellent communication device and an excellent communication system that can realize intra-body communication, non-contact communication, wireless power transmission, or the like through field coupling.

The technology disclosed in this specification further aims to provide an excellent field coupling electrode that increases field coupling efficiency between electrodes and can realize a small-sized device, and an excellent communication device and an excellent communication system of a field coupling type.

Solutions to Problems

This application is made in view of the above problems, and the technology claimed in claim 1 relates to a field coupling electrode that includes:
an electrode unit formed with a pair of electrode terminals; and
a resonant circuit unit that makes a voltage V2 to be applied to the electrode unit higher than an input voltage V1.

According to the technology claimed in claim 2 of this specification, the resonant circuit unit of the field coupling electrode of claim 1 includes: a first resonant circuit connected in series to the electrode unit; and a second resonant circuit connected in parallel to the electrode unit and the first resonant circuit, which are connected in series.

According to the technology claimed in claim 3 of this application, the first resonant circuit of the field coupling electrode of claim 2 includes at least one inductor. The second resonant circuit includes at least one inductor or capacitor. The constant of an inductor or a capacitor included in the first resonant circuit and the second resonant circuit is set so as to maintain V2>V1 at a target frequency.

According to the technology claimed in claim 4 of this application, the resonant circuit unit of the field coupling electrode of claim 2 further includes a capacitor connected in series to the electrode unit, and has a series resonant structure.

The technology claimed in claim 5 of this application relates to a communication device that includes:
an electrode unit formed with a pair of electrode terminals;

a communication processing unit that processes a communication signal; and a resonant circuit unit that makes a voltage V2 to be applied to the electrode unit higher than a voltage to be output from the communication processing unit or a voltage V1 to be input to the communication processing unit.

The technology claimed in claim 6 of this application relates to a communication system that conducts communication by a field coupling technique, with the electrode units of two communication devices facing each other via a communication path medium, each of the communication devices being the communication device of claim 5.

It should be noted that the term "system" means a logical assembly of devices (or functional modules that realize specific functions), and the respective devices or functional modules are not necessarily in a single housing.

According to the technology claimed in claim 7, the communication path medium in the communication system of claim 6 is a human body, a dielectric material, or a conductive material.

The technology claimed in claim 8 of this application relates to a communication system that conducts communication by a field coupling technique, with the electrode units of two communication devices being placed at a short distance from each other, each of the communication devices being the communication device of claim 5.

According to the technique claimed in claim 9 of this application, the communication system of claim 6 or 8 is used for wireless power transmission.

Effects of the Invention

The technology disclosed in this specification can provide an excellent field coupling electrode that increases field coupling efficiency between electrodes and can realize a small-sized device, and an excellent communication device and an excellent communication system of a field coupling type.

Other objects, features, and advantages of the technology disclosed in this specification will be made apparent by the embodiments described below and the detailed descriptions with reference to the accompanying drawings.

BRIEF DESCRIPTION OF DRAWINGS

FIG. 40 is a diagram showing results of characteristics of the respective ports Port1 through Port3 in the characteristics analysis model shown in FIG. 39.

MODES FOR CARRYING OUT THE INVENTION

The following is a detailed description of embodiments of the technology disclosed in this specification, with reference to the drawings.

Example 1

Figure 1:
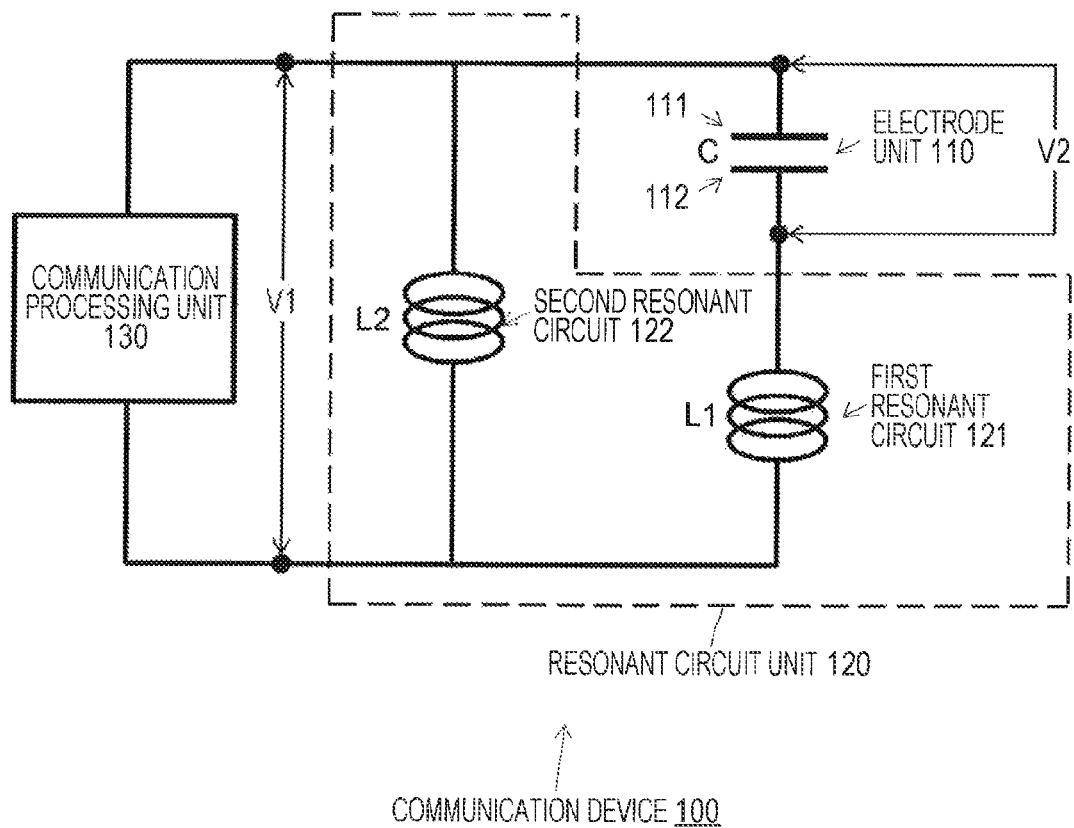
FIG. 1 is a diagram showing the structure of a communication device 100 according to an embodiment of the technology disclosed in this specification.

FIG. 1 shows the structure of a communication device 100 according to an embodiment of the technology disclosed in this specification. The communication device 100 shown in the drawing includes an electrode unit 110, a resonant circuit unit 120, and a communication processing unit 130.

The electrode unit 110 is formed with a combination of a first electrode terminal 111 and a second electrode terminal 112 that are placed to face each other. In the example shown in the drawing, the combination of the first electrode terminal 111 and the second electrode terminal 112 is formed with two conductor plates. The electrode unit 110 can be regarded as a capacitor, and the capacitance thereof is represented by C.

The resonant circuit unit 120 includes a first resonant circuit 121 that is connected in series to the electrode unit 110. The first resonant circuit 121 is formed with one inductor in the example shown in the drawing, but may include another resonant circuit in some other cases.

The resonant circuit unit 120 further includes a second resonant circuit 122 that is connected in parallel to the electrode unit 110 and the first resonant circuit 121, which are connected in series. The second resonant circuit 122 is formed with one inductor in the example shown in the drawing, but there are cases where the second resonant circuit 122 includes another resonant circuit or is formed with a capacitor, instead of an inductor (as described later).

The constant L1 of the inductor serving as the first resonant circuit 121 and the constant L2 of the inductor serving as the second resonant circuit 122 are determined so that the voltage 112 to be applied to the electrode unit 110 becomes higher than the voltage V1 to be input to the electrode unit 110 (V2/V1>1).

The communication processing unit 130 processes a communication signal. When the communication device 100 conducts transmission, V1 is a voltage output from the communication processing unit 130, and V2 is a voltage transmitted from the electrode unit 120. When the communication device 100 conducts reception, V2 is a voltage received at the electrode unit 120, and V1 is an input voltage captured by the communication processing unit 130. Where the relationship, V2/V1>1, is maintained, a field coupling electrode that has a very high coupling strength with the electrode on the other side of communication (not shown in FIG. 1) can be obtained at a target frequency.

Figure 2:
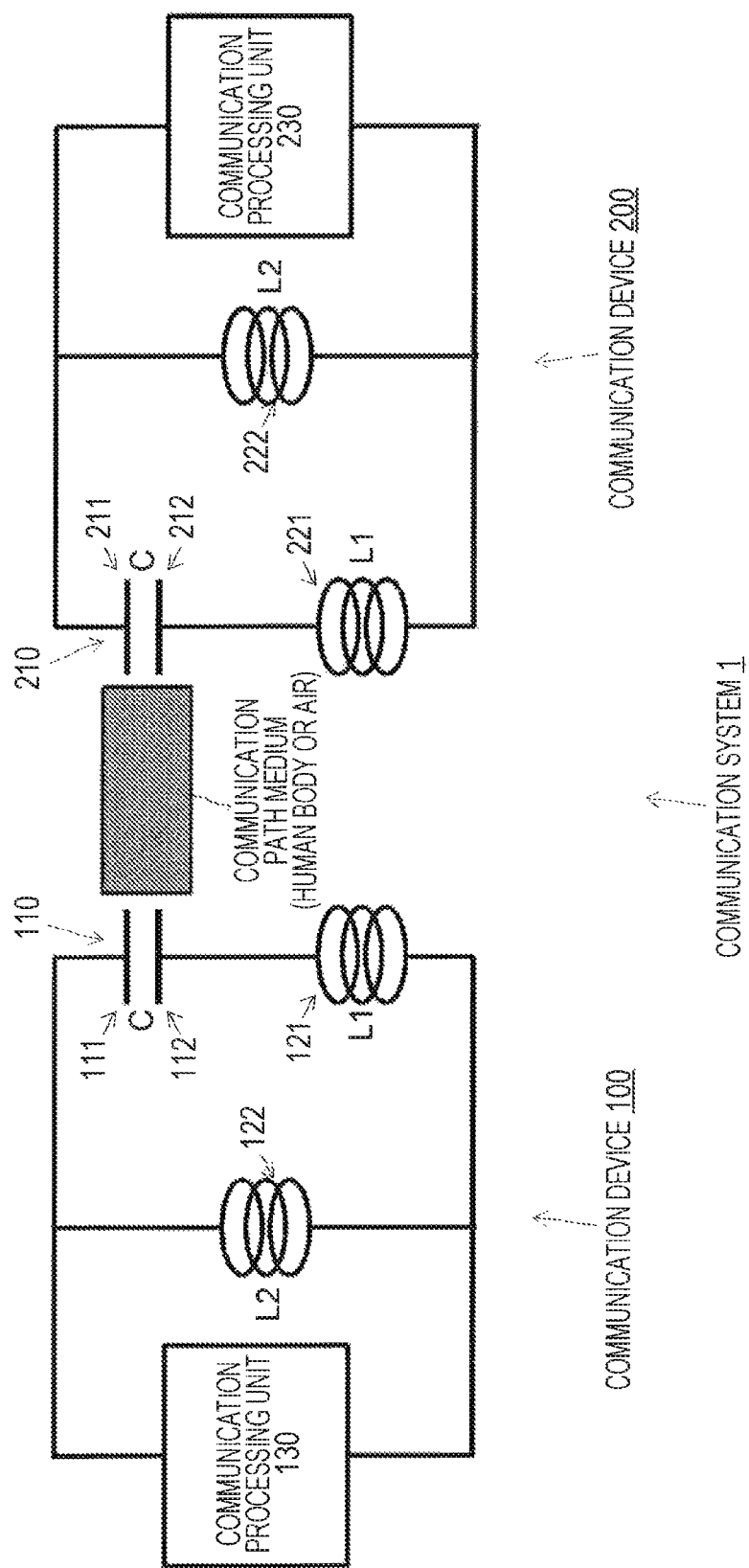
FIG. 2 is a diagram showing a communication system 1 formed with a combination of the communication device 100 and a communication device 200 that has the same structure as the communication device 100.

FIG. 2 shows a communication system 1 formed with a combination of the communication device 100 and a communication device 200 that has the same structure as the communication device 100.

A human body (or a dielectric or conductive material) as a communication path medium, for example, is interposed between the electrode unit 110 of the communication device 100 and the elect rode unit 210 of the other communication device 200. In the communication device 100, the constants L1 and L2 of the respective elements of the resonant circuit unit 120 are set so that the voltage V2 to be applied to the electrode unit 110 becomes higher than the voltage V1 to be input from the communication processing unit 130 to the electrode unit 110. In the other communication device 200, the constants L1 and L2 of the respective elements of the resonant circuit unit 220 are set so that the voltage V2 to be applied to the electrode unit 210 becomes higher than the input voltage V1 to be captured by the communication processing unit 230. In this manner, the electrode unit 110 and the electrode unit 210 can be field coupling electrodes with a very high coupling strength at a target frequency.

Figure 48:
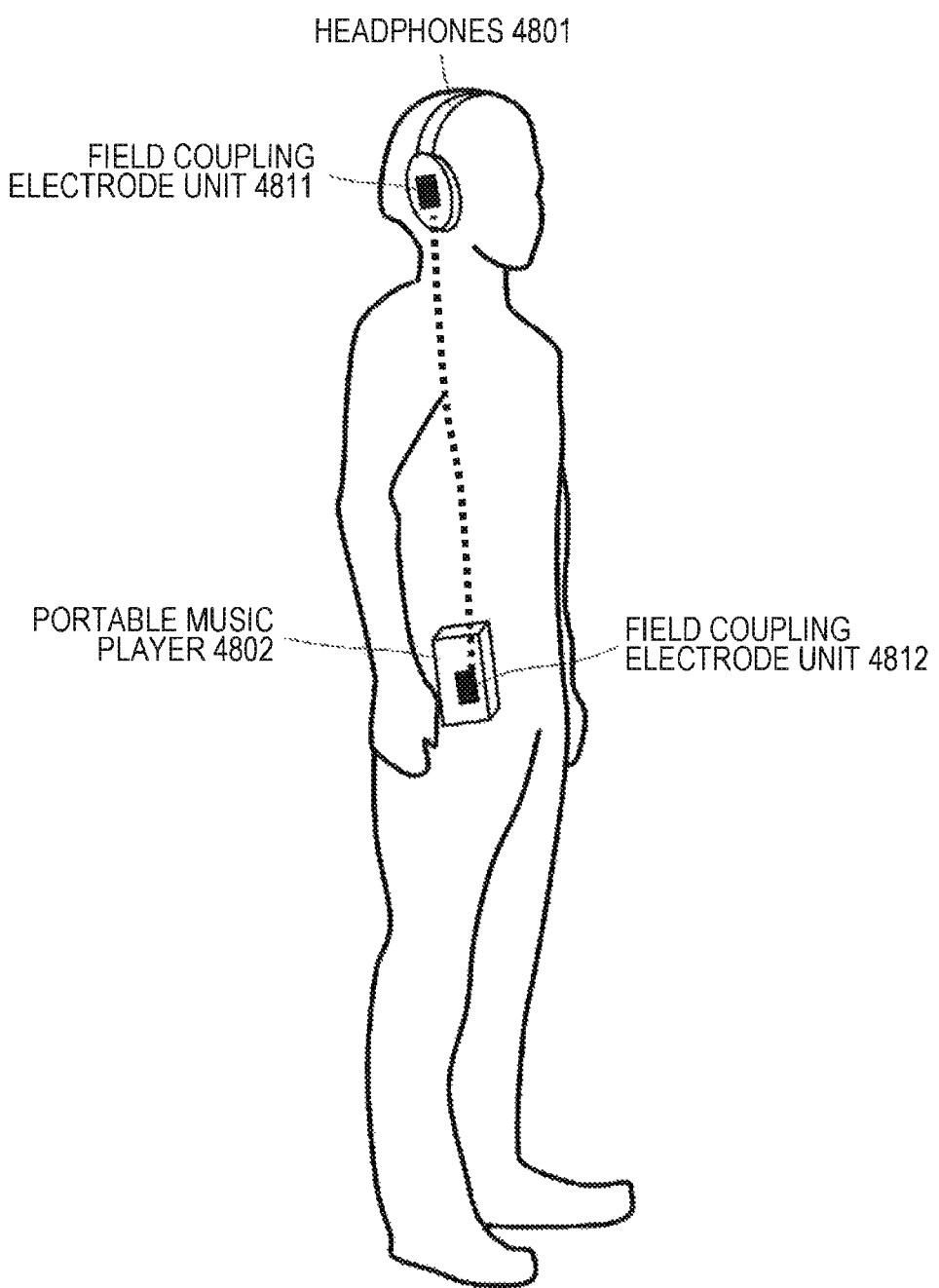
FIG. 48 is a diagram showing a situation where a communication system according to the technology disclosed in this specification is used in intra-body communication.
Figure 49:
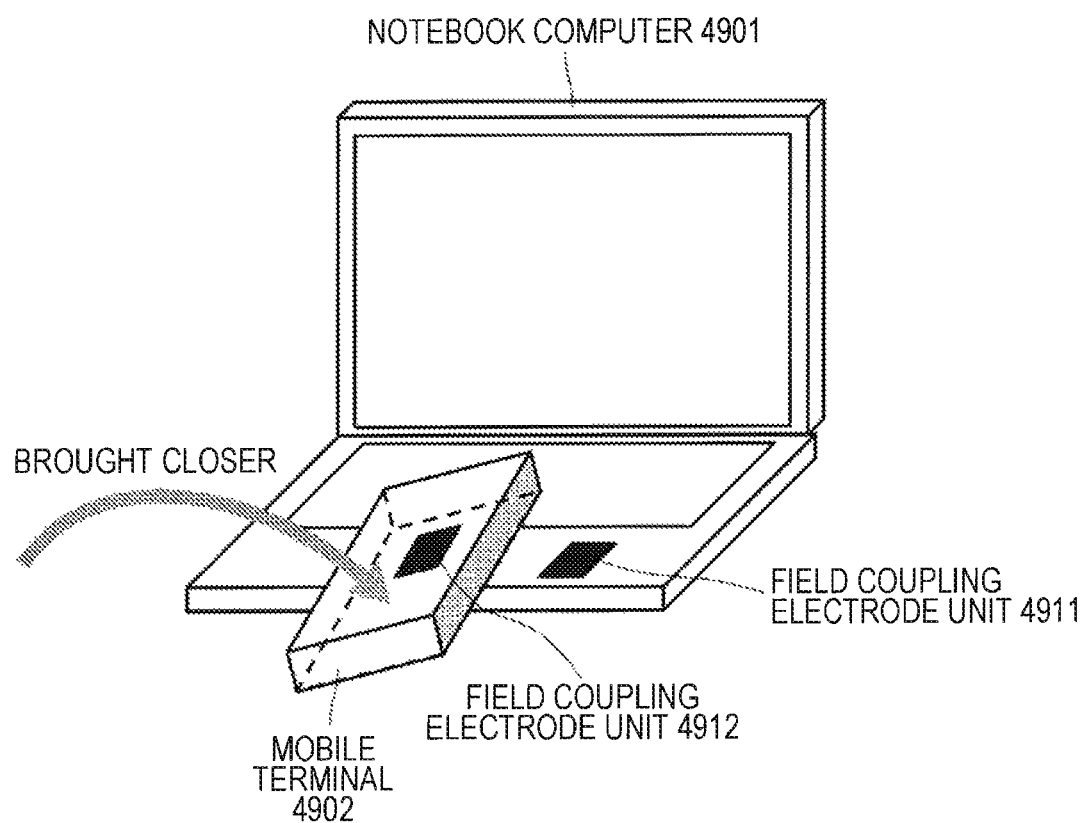
FIG. 49 is a diagram showing a situation where a communication system according to the technology disclosed in this specification is used in short-range communication.

Alternatively, only air, instead of a dielectric material such as a human body, may be interposed between the electrode unit 110 of the communication device 100 and the electrode unit 210 of the other communication device 200, with the electrode unit 110 and the electrode unit 210 being placed closer to each other. In the former case, the communication system 1 conducts intra-body communication. In the latter case, the communication system 1 conducts non-contact short-range communication. FIG. 48 shows a situation where intra-body communication is conducted between headphones 4801 including a field coupling electrode unit 4811 and a portable music player 4802 including a field coupling electrode unit 4812. FIG. 49 shows a situation where short-range communication is conducted between field coupling electrode units 4911 and 4912 that are embedded in the main unit of a notebook computer 4901 and a mobile terminal 4902 brought close to the main unit. By either method of intra-body communication and short-range communication, wireless power transmission can be performed, as the other communication device 200 obtains electric power by rectifying an electric field signal transmitted from the communication device 100.

Figure 3:
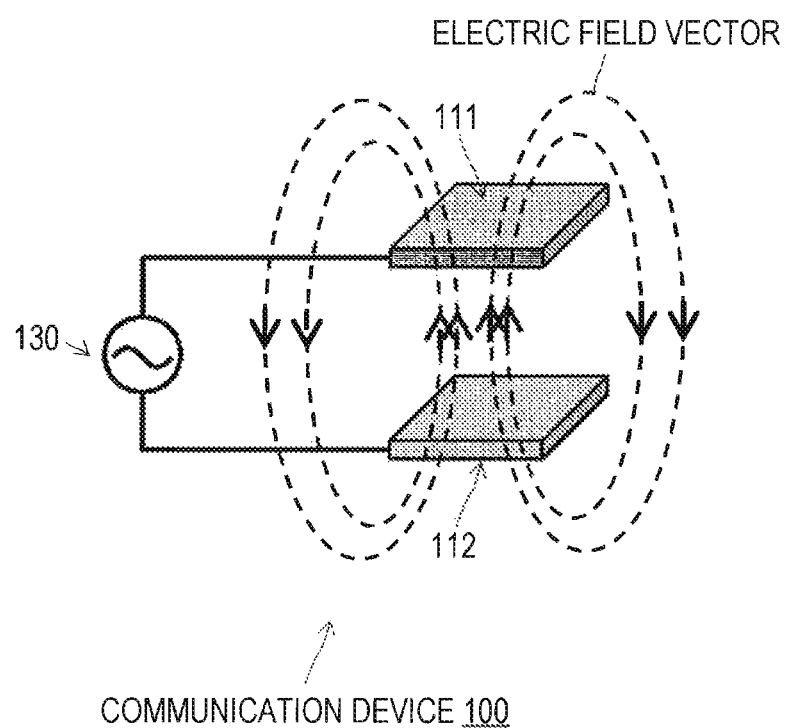
FIG. 3 is a diagram showing a situation where the electrode unit 110 of the communication device 100 forms an electric field vector.
Figure 4:
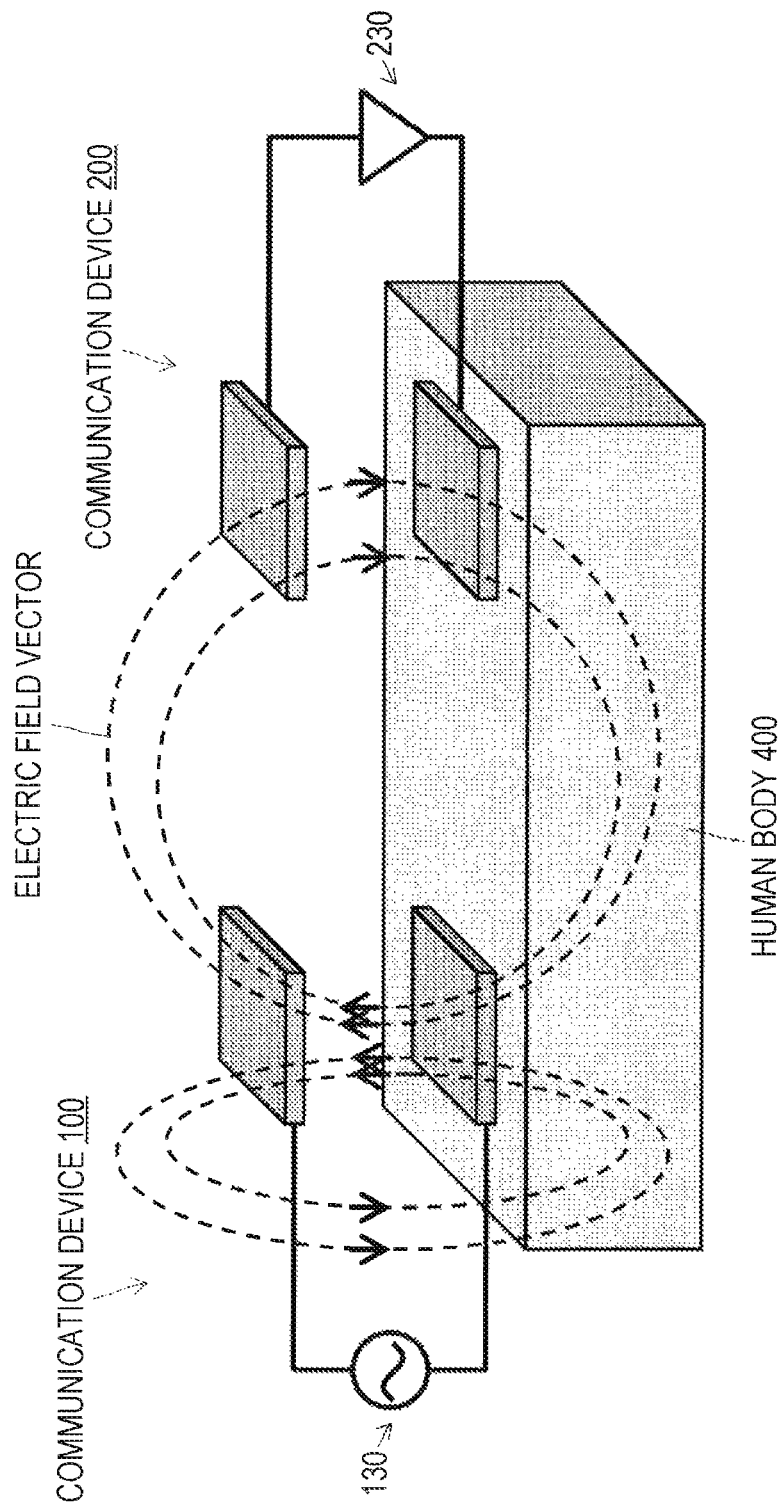
FIG. 4 is a diagram showing a situation where an electric field vector is formed between the electrode unit 110 of the communication device 100 and the electrode unit 210 of the communication device 200.

FIG. 3 shows a situation where the electrode unit 110 of the communication device 100 forms an electric field vector. FIG. 4 shows a situation where an electric field vector is formed by obtaining field coupling electrodes having a very high coupling strength between the electrode unit 110 of the communication device 100 and the electrode unit 210 of the communication device 200 at a target frequency. In a case where a human body 400 is interposed as a communication path medium between the electrode unit 110 and the electrode unit 210, the human body 400 guides the electric field, and accordingly, a very high coupling strength can be obtained.

Figure 47:
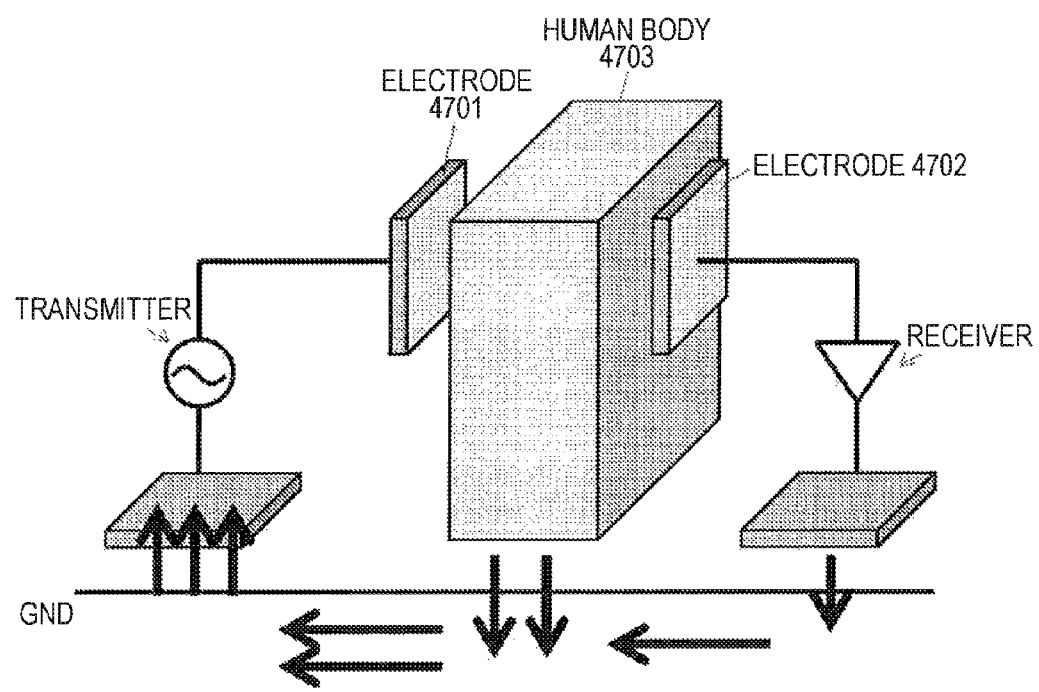
FIG. 47 is a diagram schematically showing the configuration of a conventional intra-body communication system.

FIG. 47 schematically shows the configuration of a conventional intra-body communication system for reference (see Patent Document 1 and Patent Document 2, for example). In this communication system, a human body 4703 as a communication path medium is interposed between two electrodes 4701 and 4702 facing each other. This communication system can also be regarded as a parallel resonant circuit that has an inductor connected in parallel to electrodes formed with two conductor plates. In the communication system according to this embodiment, on the other hand, the communication devices 100 and 200 include the respective electrode units 110 and 210 each formed with two electrode plates, and these electrode units 110 and 210 are placed to face each other across a communication path medium such as the human body 400. This configuration clearly differs from the configuration of the communication system shown in FIG. 47. Also, the communication system shown in FIG. 47 is formed with a closed line that encloses a capacitor having the human body 4703 interposed between the two electrodes 4701 and 4702, and a ground 4704. However, it is apparent that the voltage V2 to be applied between the electrodes 4701 and 4702 is equal no or lower than an input voltage V1 (V2/V1≤1), and the effect to increase coupling strength cannot be expected.

FIGS. 5 through 8 show the results of circuit simulations performed to measure the voltage ratio V2/V1 between the voltage V2 to be applied to the electrode unit 110 and the voltage V1 to be input from the communication processing unit 130 in the communication device 100 shown in FIG. 1.

Figure 5:
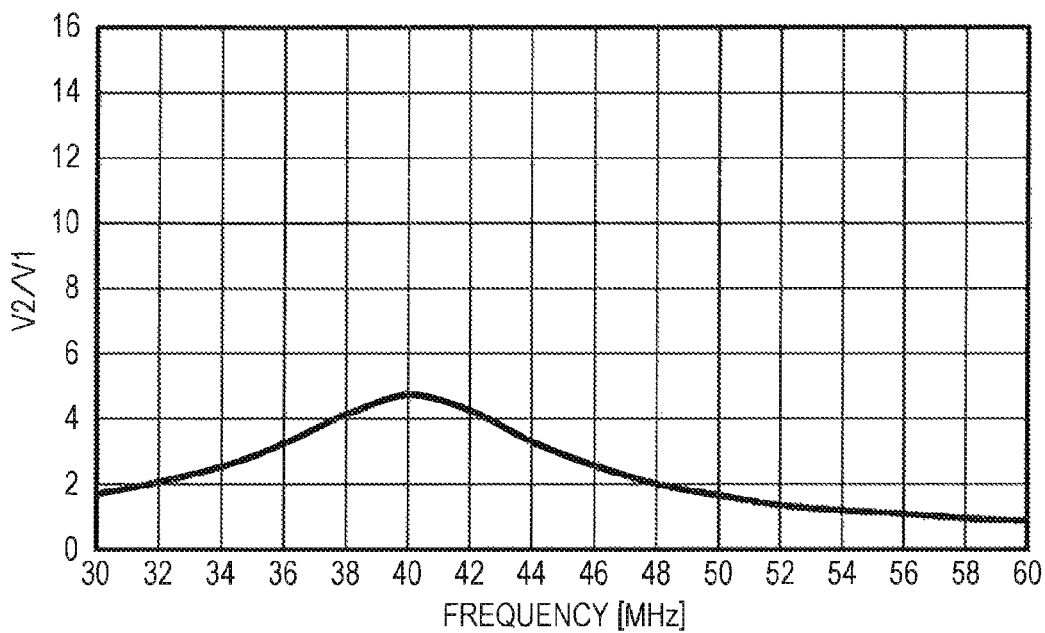
FIG. 5 is a diagram showing the result of a circuit simulation performed to measure the voltage ratio V2/V1 between the voltage V2 to be applied to the electrode unit 110 and the voltage V1 to be input from the communication processing unit 130 (L1=0.67 μH, L2=0.3 μH).
Figure 6:
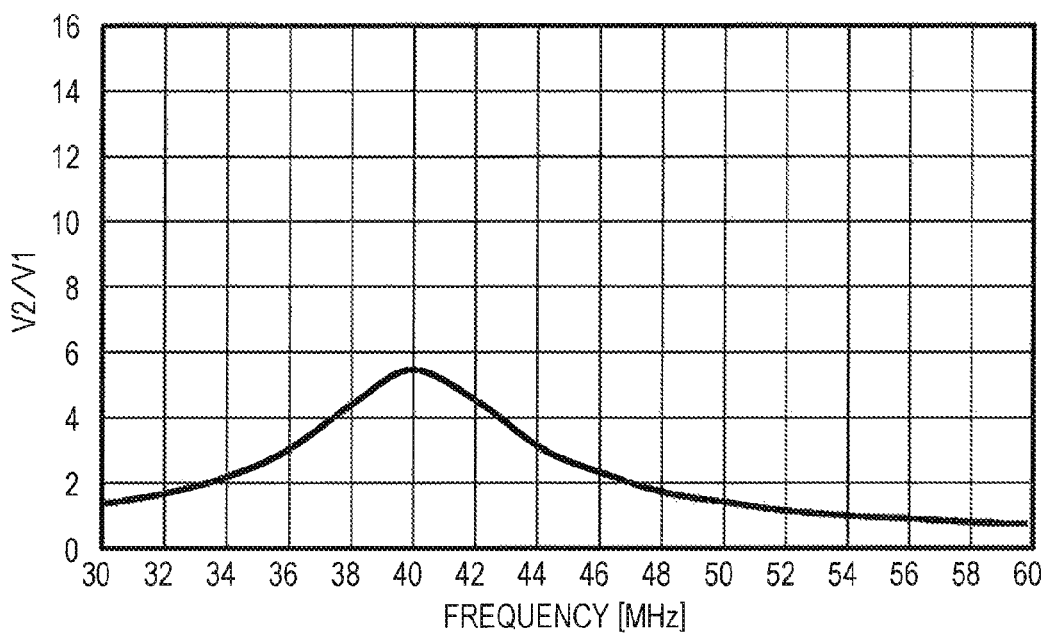
FIG. 6 is a diagram showing the result of a circuit simulation performed to measure the voltage ratio V2/V1 between the voltage V2 to be applied to the electrode unit 110 and the voltage V1 to be input from the communication processing unit 130 (L1=0.67 μH, L2=0.2 μH).
Figure 7:
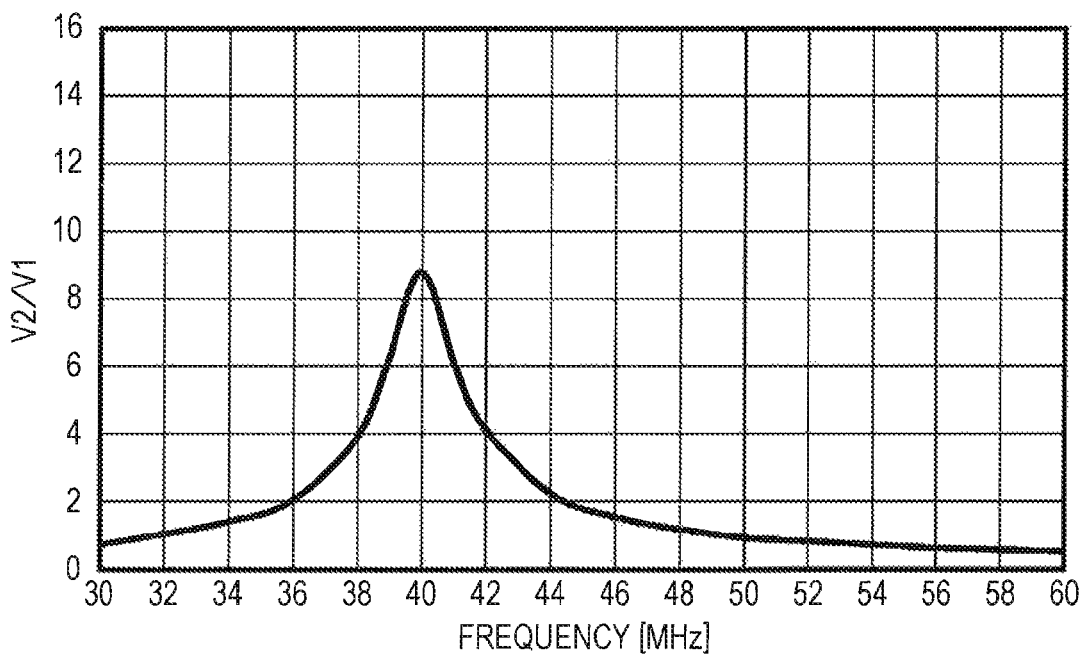
FIG. 7 is a diagram showing the result of a circuit simulation performed to measure the voltage ratio V2/V1 between the voltage V2 to be applied to the electrode unit 110 and the voltage V1 to be input from the communication processing unit 130 (L1=0.70 μH, L2=0.1 μH).
Figure 8:
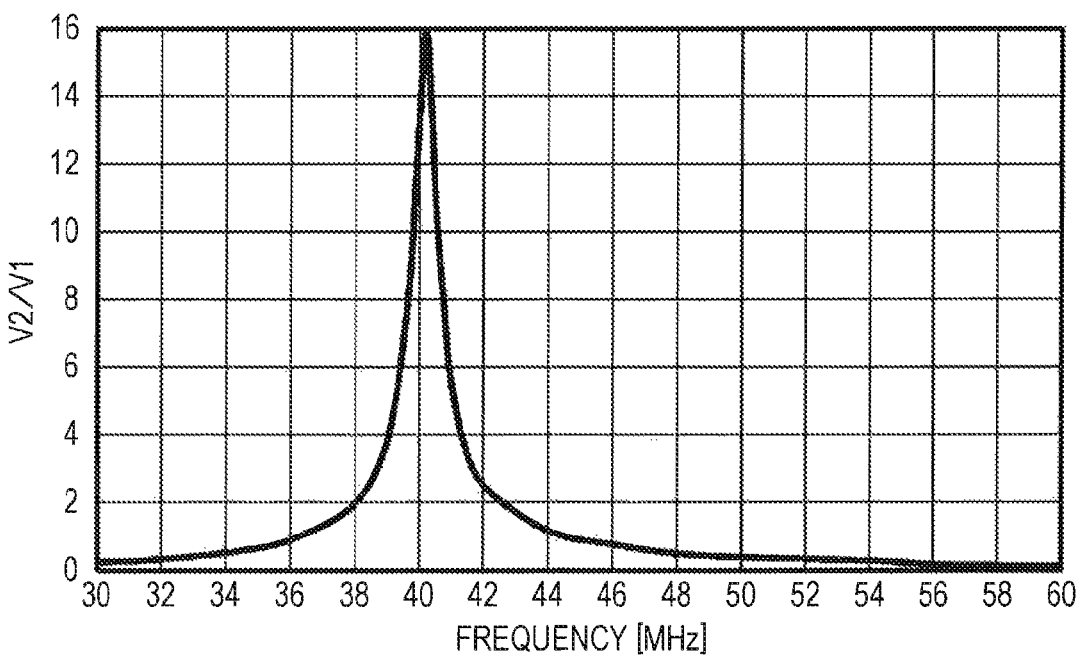
FIG. 8 is a diagram showing the result of a circuit simulation performed to measure the voltage ratio V2/V1 between the voltage V2 to be applied to the electrode unit 110 and the voltage V1 to be input from the communication processing unit 130 (L1=0.73 μH, L2=0.05 μH).

In the analysis model used here, a single inductor L1 serving as the first resonant circuit 121 is connected in series to a capacitor C formed with two conductor plates serving as the electrode unit 110, and a single inductor L2 serving as the second resonant circuit 122 is connected in parallel to the capacitor C and the inductor L1. Simulations were performed to measure the voltage ratio V2/V1, while the capacitance C of the electrode unit 110 was fixed at 20.2 pF, the resonant frequency was fixed at 40 MHz, and the inductances of the respective inductors L1 and L2 were changed. FIG. 5 shows the result of a simulation in which L1=0.67 µH and L2=0.3 µH, FIG. 6 shows the result of a simulation in which L1=0.67 µH and L2=0.2 µH, FIG. 7 shows the result of a simulation in which L1=0.70 µH and L2=0.1 µH, and FIG. 8 shows the result of a simulation in which L1=0.73 µH and L2=0.05 µH.

As can be seen from the results shown in FIGS. 5 through 8, where the value of the inductance of the inductor L2 connected in parallel to the electrode unit 110 and the first resonant circuit 121 is smaller, the peak value of the voltage ratio V2/V1 is larger, or the coupling strength is higher.

In the case of a parallel resonant circuit (see FIG. 47) that does not apply any inductor to the electrode unit formed with two conductor plates, an inductor L2 of 0.78 µH needs to be connected as the second resonant circuit 122 connected in parallel, so as to obtain parallel resonance with the electrode unit 110 having a capacitance of 20.2 pF. The maximum value of the voltage ratio V2/V1 in this case is 1, and therefore, the effect to increase the coupling strength cannot be achieved. In other words, as the first resonant circuit 121 is connected in series to the electrode unit 110 as shown in FIG. 1, the peak value of the voltage ratio V2/V1 is much larger than 1.0, and a field coupling electrode with a very high coupling strength can be obtained.

FIGS. 9 through 12 show the results of three-dimensional electromagnetic field simulations performed to measure the coupling strength S21 [dB] between the electrode of the transmitting side and the electrode of the receiving side when two electrode units 110 having resonant structures are placed on a human body model.

Figure 9:
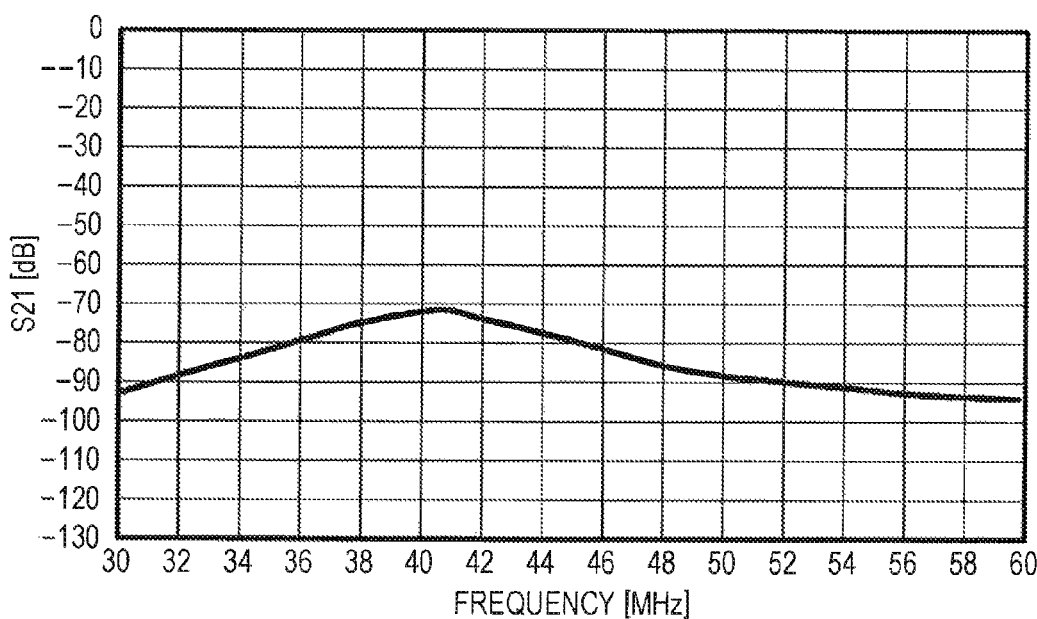
FIG. 9 is a diagram showing the result of a three-dimensional electromagnetic field simulation performed to measure the coupling strength S21 [dB] between the electrode of the transmitting side and the electrode or the receiving side when two electrode units 110 having resonant structures are placed on a human body model (L1=0.67 μH, L2=0.3 μH).
Figure 10:
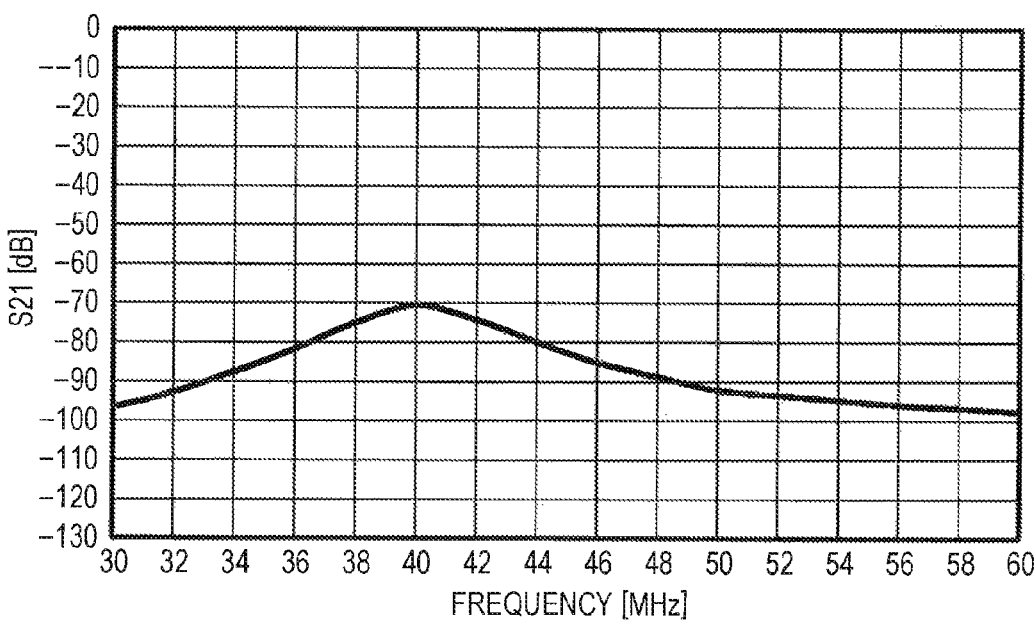
FIG. 10 is a diagram showing the result of a three-dimensional electromagnetic field simulation performed to measure the coupling strength S21 [dB] between the electrode of the transmitting side and the electrode of the receiving side when two electrode units 110 having resonant structures are placed on a human body model (L1=0.67 μH, L2=0.2 μH).
Figure 11:
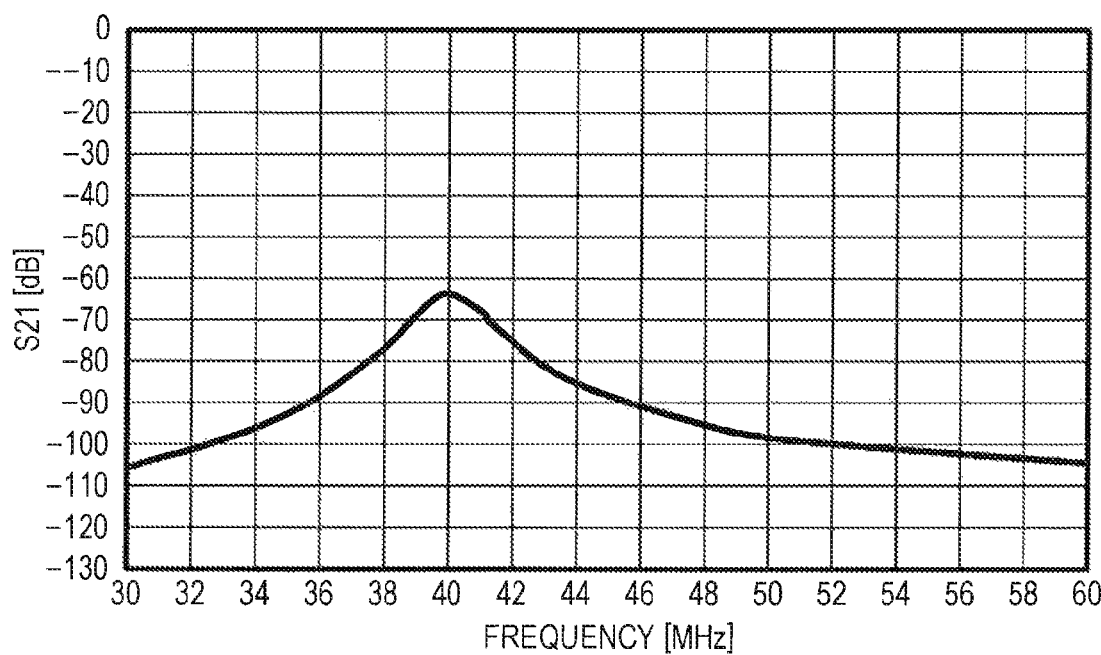
FIG. 11 is a diagram showing the result of a three-dimensional electromagnetic field simulation performed to measure the coupling strength S21 [dB] between the electrode of the transmitting side and the electrode of the receiving side when two electrode units 110 having resonant structures are placed on a human body model (L1=0.70 μH, L2=0.1 μH).
Figure 12:
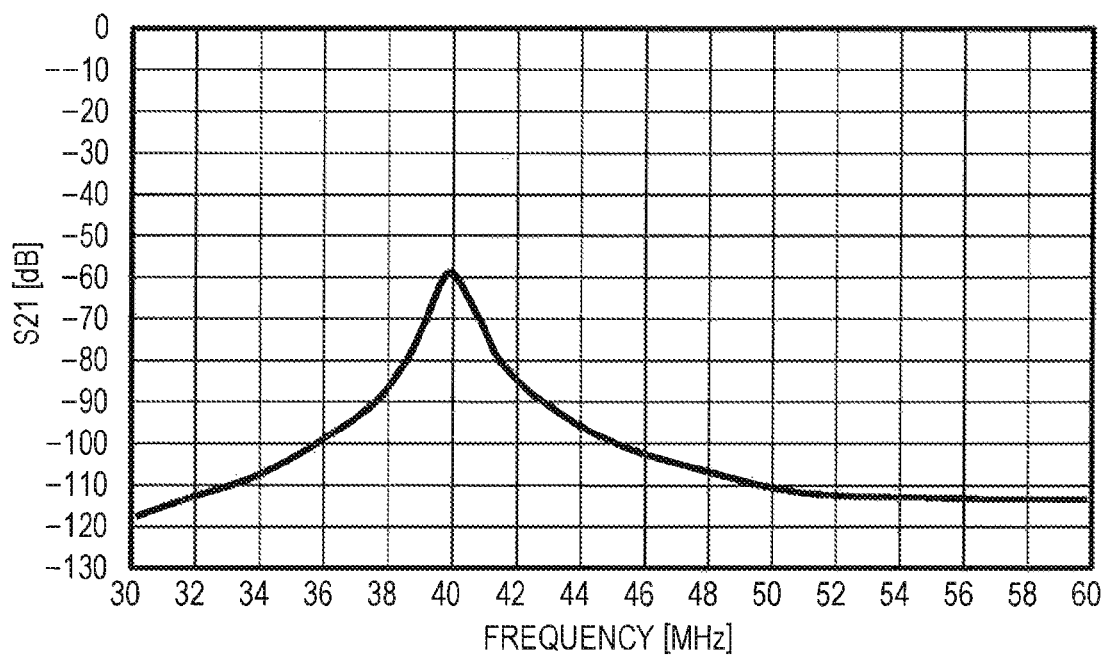
FIG. 12 is a diagram showing the result of a three-dimensional electromagnetic field simulation performed to measure the coupling strength S21 [dB] between the electrode of the transmitting side and the electrode of the receiving side when two electrode units 110 having resonant structures are placed on a human body model (L1=0.73 μH, L2=0.05 μH).
Figure 13:
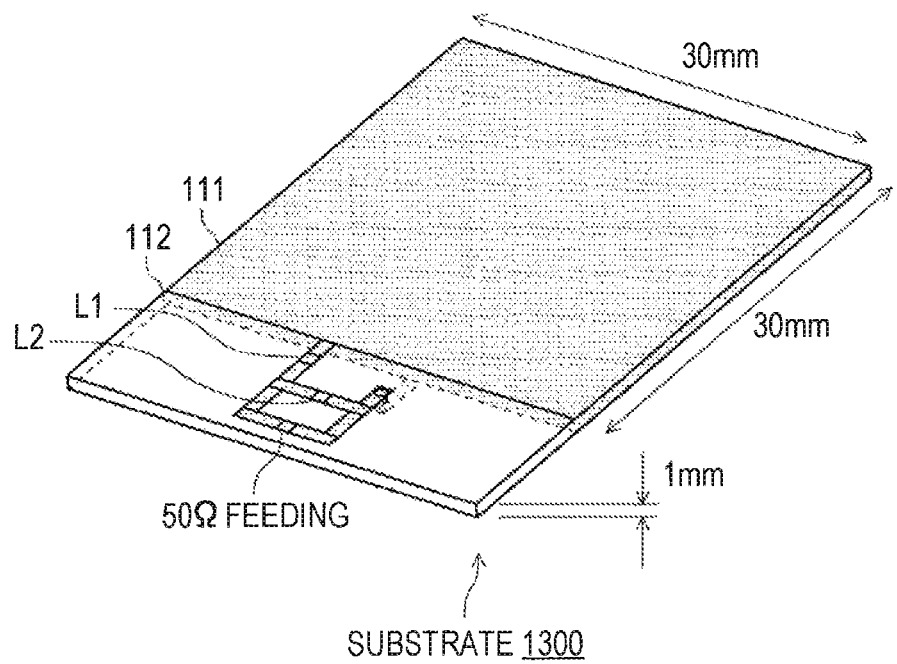
FIG. 13 is a diagram showing the analysis model used in three-dimensional electromagnetic field simulations performed to measure the coupling strength S21 [dB] between electrodes.
Figure 14:
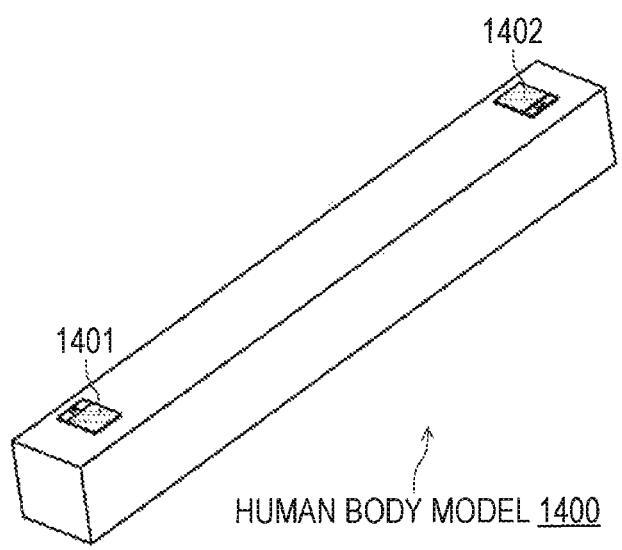
FIG. 14 is a diagram showing the analysis model used in three-dimensional electromagnetic field simulations performed to measure the coupling strength S21 [dB] between electrodes.

The analysis models used in the three-dimensional electromagnetic field simulations are shown in FIGS. 13 and 14. FIG. 13 shows the specific structure of the electrode model that is used on the transmitting side and the receiving side (power being fed from the communication processing unit 130 with a characteristic impedance of 50Ω). The two electrodes 111 and 112 are perfect conductors of 30×30×0.04 mm, and are provided on the upper and lower surfaces, respectively, of a substrate 1300 that is 1.0 mm in thickness, 2.2 in relative permittivity $\in_r$', and 0.001 in tan δ. Each of the inductors L1 and L2 constituting the resonant circuit unit 120 is modeled on a wiring pattern formed with a perfect conductor of 1.0 mm in line width on the upper surface of the substrate 1300. FIG. 14 shows a situation where electrodes 1401 and 1402 of the transmitting side and the receiving side are placed on a human body model 1400. The human body model 1400 shown in the drawing is 70×70×600 mm in size, which is supposed to be the size of a human arm, and a relative permittivity $\in_r$' of 55.05 and a conductivity σ of 0.446 S/m, which are two thirds of the muscular physical property values at a resonant frequency of 40 [MHz], are set as the material physical property values. For reference, the material physical property values of a pseudo human at a frequency 40 [MHz] are a relative permittivity $\in_r$' of 82.575241 and a conductivity σ of 0.6691.99 S/m. Each of the electrodes 1401 and 1402 of the transmitting side and the receiving side is placed at a distance of 35 mm from each corresponding end of the human body model 1400 in the longitudinal direction, and the inter-electrode distance is 470 mm. Also, each of the electrodes 1401 and 1402 is not in contact with the human body model 1400, and an air space of 1.0 mm is provided. Simulations were performed to measure the coupling strength S21 [dB] between the electrodes placed at both ends of the human body model 1400 in the longitudinal direction, while the capacitance C of the electrode unit 110 was fixed at 20.2 pF, the resonant frequency was fixed at 40 MHz, and the inductances of the respective inductors L1 and L2 were changed. FIG. 9 shows the result of a simulation in which L1=0.67 µH and L2=0.3 µH, FIG. 10 shows the result of a simulation in which L1=0.67 µH and L2=0.2 µH, FIG. 11 shows the result of a simulation in which L1=0.70 µH and L2=0.1 µH, and FIG. 12 shows the result of a simulation in which L1=0.73 µH and L2=0.05 µH.

As can be seen from the results shown in FIGS. 9 through 12, where the value of the inductance of the inductor L2 connected parallel to the electrode unit 110 and the first resonant circuit 121 is smaller, the peak value of the coupling strength S21 [dB] between the two electrodes is larger. Also, the waveforms of the coupling strengths S21 [dB] tend to be similar to the respective waveforms of the voltage ratios V2/V1 shown in FIGS. 5 through 8.

Figure 15:
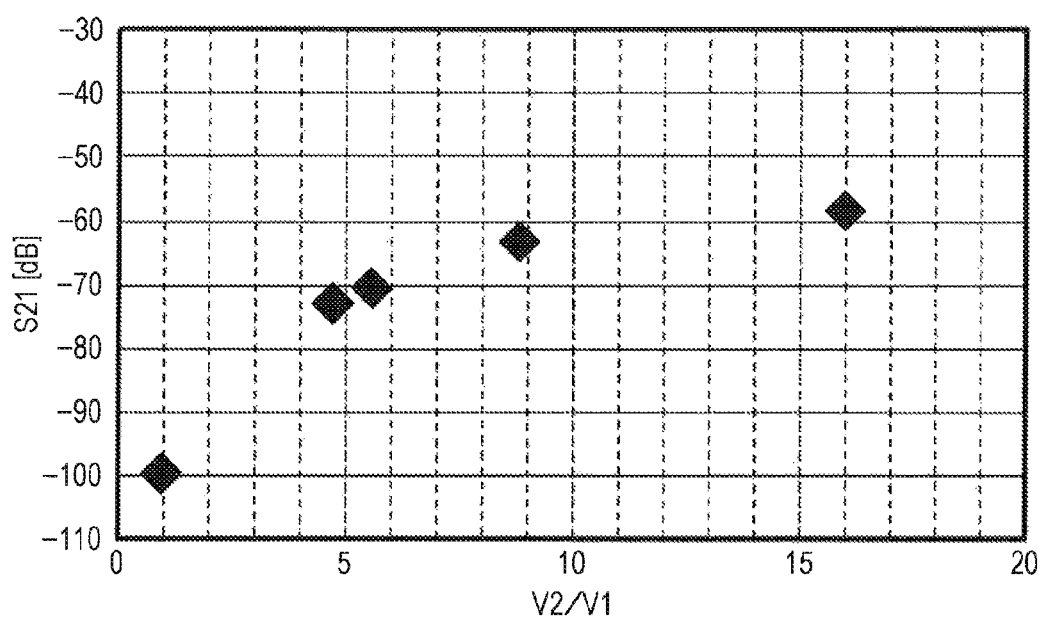
FIG. 15 is a diagram showing the relationship between the voltage ratios V2/V1 shown in FIGS. 5 through 8 and the coupling strengths S21 [dB] shown in FIGS. 9 through 12.

FIG. 15 shows the relationship between the voltage ratios V2/V1 shown in FIG. 5 through 8 and the coupling strengths S21 [dB] shown in FIGS. 9 through 12. As can be seen from FIG. 15, the coupling strength S21 [dB] between the electrodes tends to increase as the voltage ratio V2/V1 becomes higher. Also, while the voltage ratio V2/V1 is 1 in the structure of a parallel resonant circuit (see FIG. 47) that has an inductor connected in parallel to electrodes formed with two conductor plates, the coupling strength S21 between the two electrodes increases by approximately 30 dB in the resonant circuit structure shown in FIG. 1 with the voltage ratio V2/V1 of 5.0.

Figure 16:
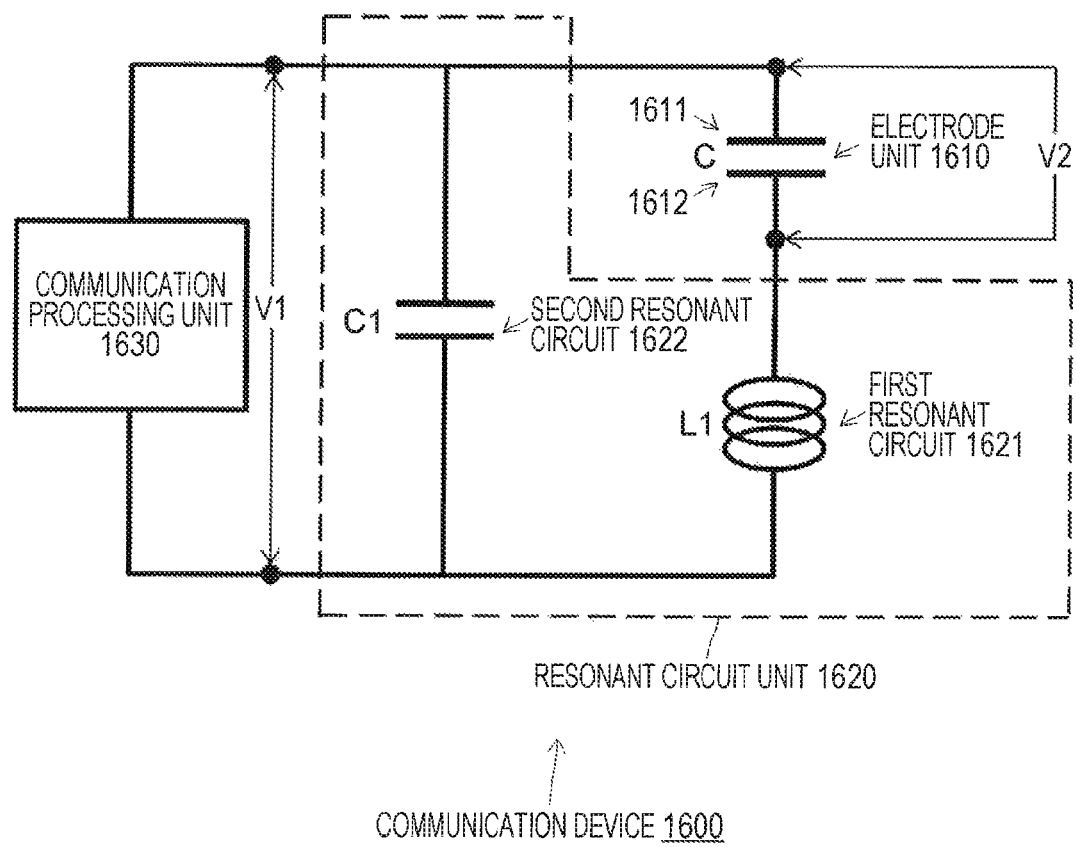
FIG. 16 is a diagram showing the structure of a communication device 1600 according to another embodiment of the technology disclosed in this specification.

FIG. 16 shows the structure of a communication device 1600 according to another embodiment of the technology disclosed in this specification. The communication device 1600 shown in the drawing includes an electrode unit 1610 formed with a first electrode terminal 1611 and a second electrode terminal 1612, a resonant circuit unit 1620, and a communication processing unit 1630.

The communication device 1600 differs from the communication device 100 shown in FIG. 1 in the structure of the resonant circuit unit 1620. Specifically, the communication device 1600 is the same as the communication device 100 in that a first resonant circuit 1621 formed with an inductor L1 is connected in series to the electrode unit 1610, but differs from the communication device 100 in that a second resonant circuit 1622 formed with a capacitor C1, instead of an inductor, is connected in parallel to the electrode unit 110 and the first resonant circuit 1621, which are connected in series.

The constant L1 of the inductor serving as the first resonant circuit 1621 and the constant C1 of the capacitor serving as the second resonant circuit 122 are determined so that the voltage V2 to be applied to the electrode unit 1610 becomes higher than the voltage V1 to be input to the electrode unit 1610 (V2/V1>1).

Although not shown in the drawing, where the electrode units 1610 of two communication devices 1600 are placed to face each other via a communication path medium such as a human body, this medium guides the electric field. Accordingly, a very high coupling strength can be obtained at a target frequency, and communication based on field coupling can be conducted.

FIGS. 17 through 20 show the results of circuit simulations performed to measure the voltage ratio V2/V1 between the voltage V2 to be applied to the electrode unit 1610 and the voltage V1 to be input from the communication processing unit 1630 in the communication device 1600 shown in FIG. 16.

Figure 17:
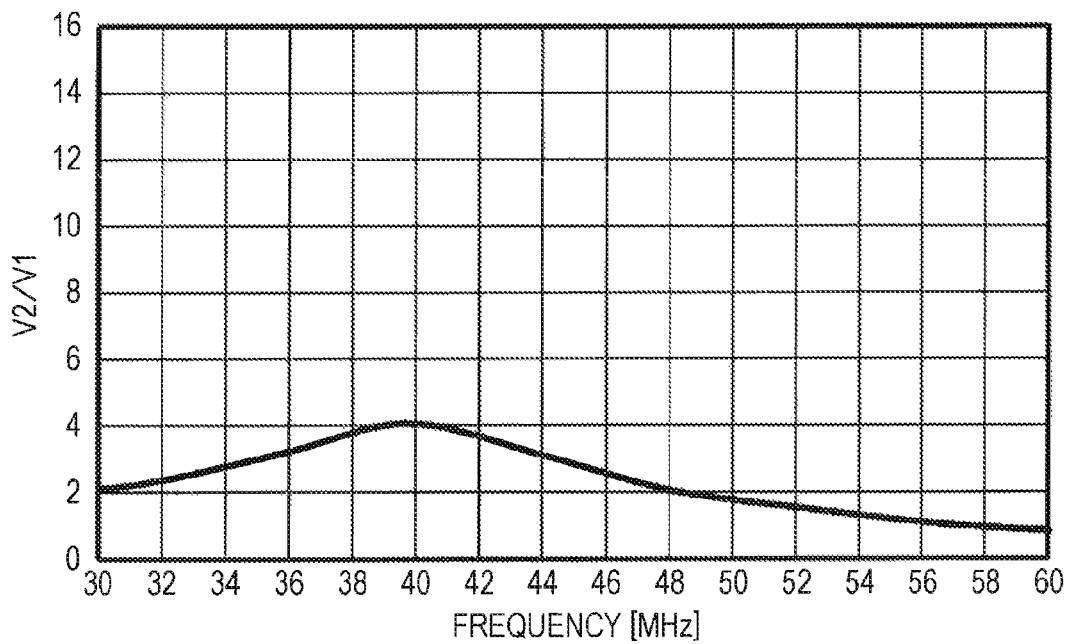
FIG. 17 is a diagram showing the result of a circuit simulation performed to measure the voltage ratio V2/V1 between the voltage V2 to be applied to the electrode unit 1610 and the voltage V1 to be input from the communication processing unit 130 (L1=0.76 μH, C1=0.1 pF).
Figure 18:
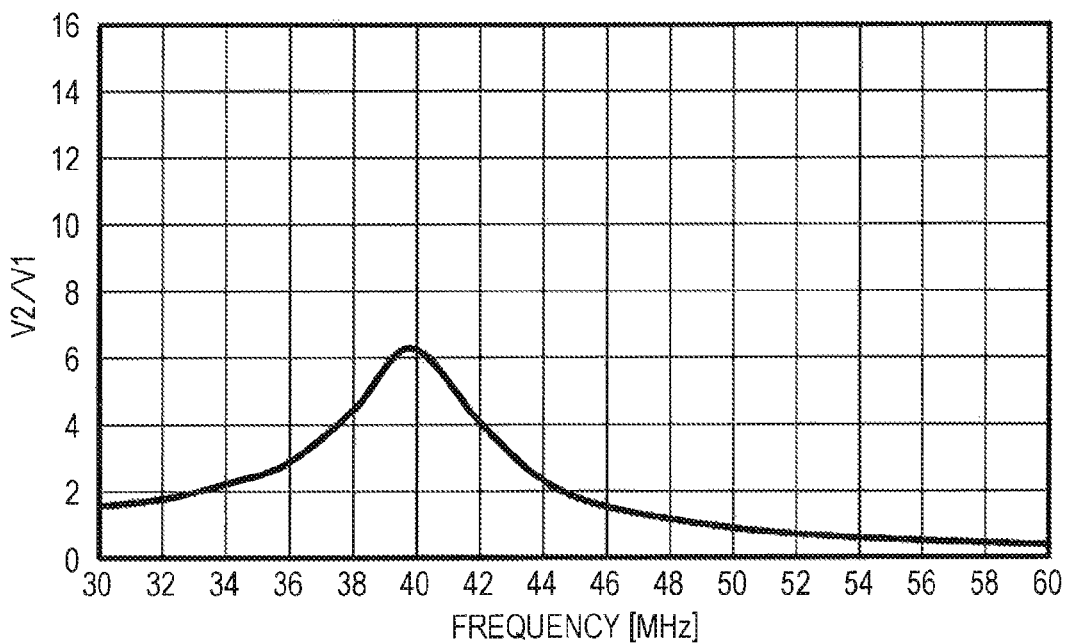
FIG. 18 is a diagram showing the result of a circuit simulation performed to measure the voltage ratio V2/V1 between the voltage V2 to be applied to the electrode unit 1610 and the voltage V1 to be input from the communication processing unit 130 (L1=0.88 μH, C1=100 μF).
Figure 19:
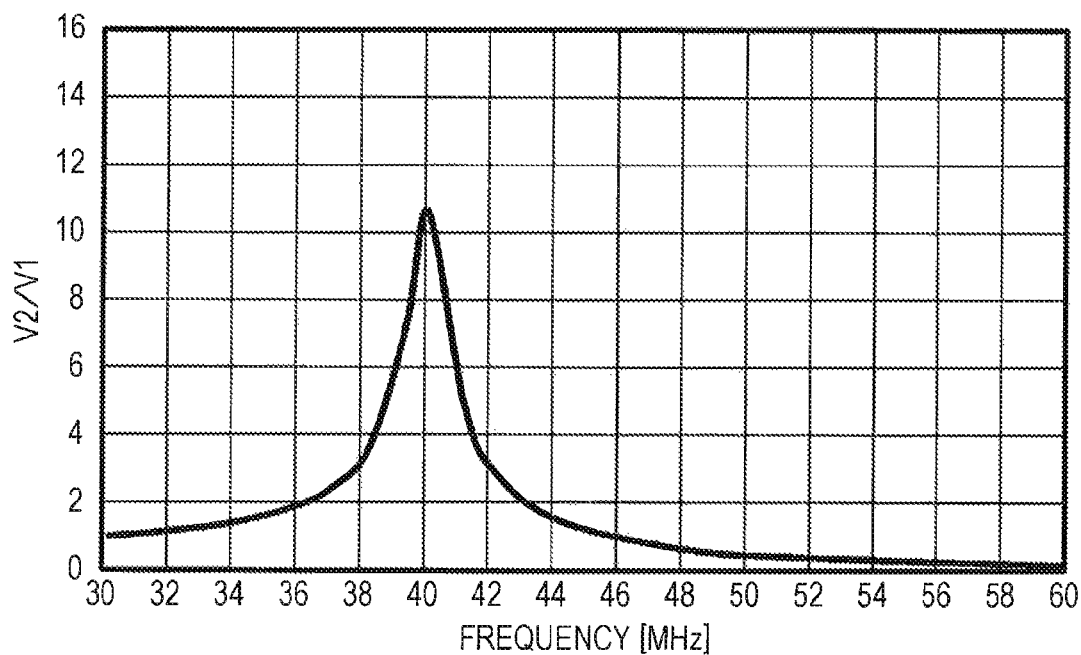
FIG. 19 is a diagram showing the result of a circuit simulation performed to measure the voltage ratio V2/V1 between the voltage V2 to be applied no the electrode unit 1610 and the voltage V1 to be input from the communication processing unit 130 (L1=0.85 μH, C1=200 μF).
Figure 20:
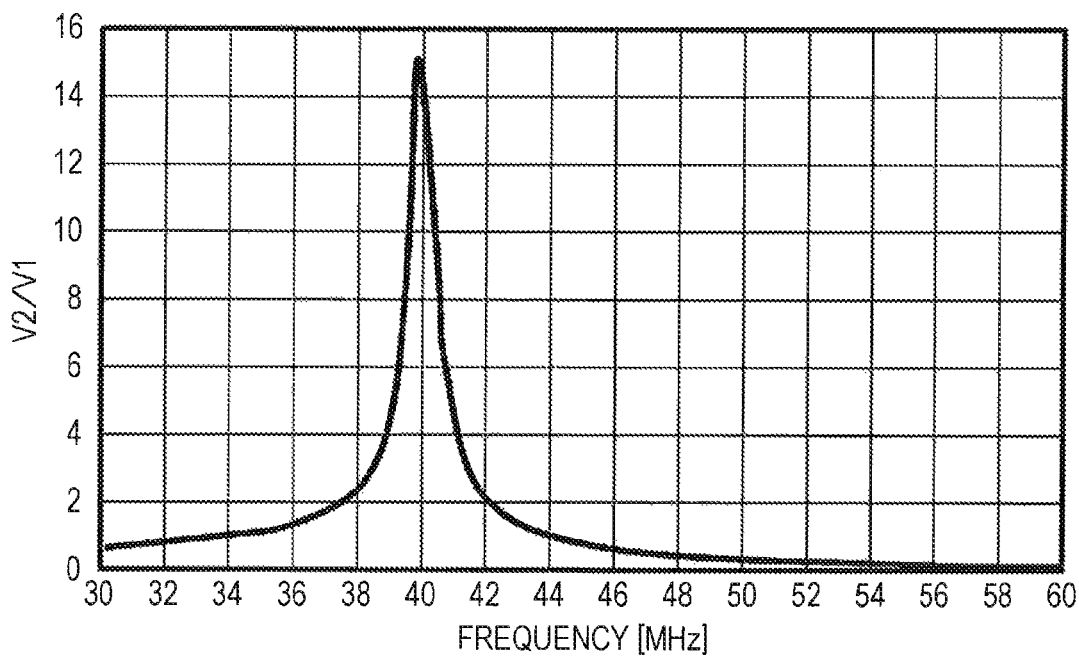
FIG. 20 is a diagram showing the result of a circuit simulation performed to measure the voltage ratio V2/V1 between the voltage V2 to be applied to the electrode unit 1610 and the voltage V1 to be input from the communication processing unit 130 (L1=0.83 µH, C1=300 pF).

In the analysis model used here, a single inductor L1 serving as the first resonant circuit 121 is connected in series to a capacitor C formed with two conductor plates serving as the electrode unit 1610, and a single capacitor C1 serving as the second resonant circuit 1622 is connected in parallel to the capacitor C and the inductor L1. Simulations were performed to measure the voltage ratio V2/V1, while the capacitance C of the electrode unit 1610 was fixed at 20.2 pF, the resonant frequency was fixed at 40 MHz, and the respective constants of the inductor L1 and the capacitor C1 were changed. FIG. 17 shows the result of a simulation in which L1=0.76 μH and C1=0.1 pF, FIG. 18 shows the result of a simulation in which L1=0.88 μH and C1=100 pF, FIG. 19 shows the result of a simulation in which L1=0.85 μH and C1=200 pF and FIG. 20 shows the result of a simulation in which L1=0.83 μH and C1=300 pF.

As can be seen from the results shown in FIGS. 17 through 20, where the value of the capacitance of the capacitor C1 connected in parallel to the electrode unit 1610 and the first resonant circuit 1621 is smaller, the peak value of the voltage ratio V2/V1 is larger, or the coupling strength is higher.

Figure 21:
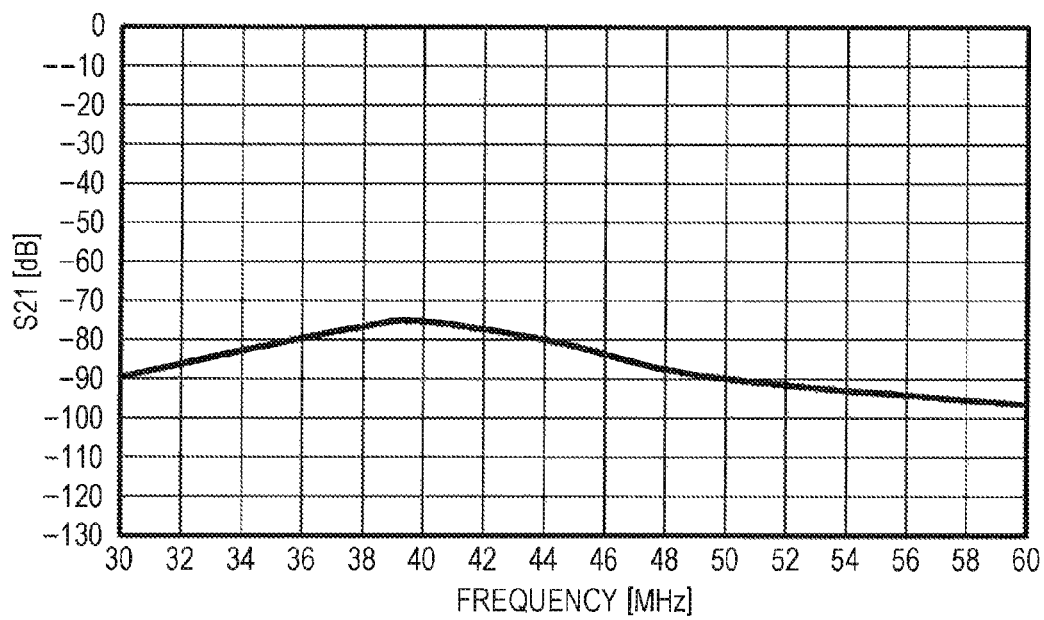
FIG. 21 is a diagram showing the result of a three-dimensional electromagnetic field simulation performed to measure the coupling strength S21 [dB] between the electrode of the transmitting and the electrode of the receiving side when two electrode units 1610 having resonant structures are placed on a human body model (L1=0.76 µH, C1=0.1 pF).
Figure 22:
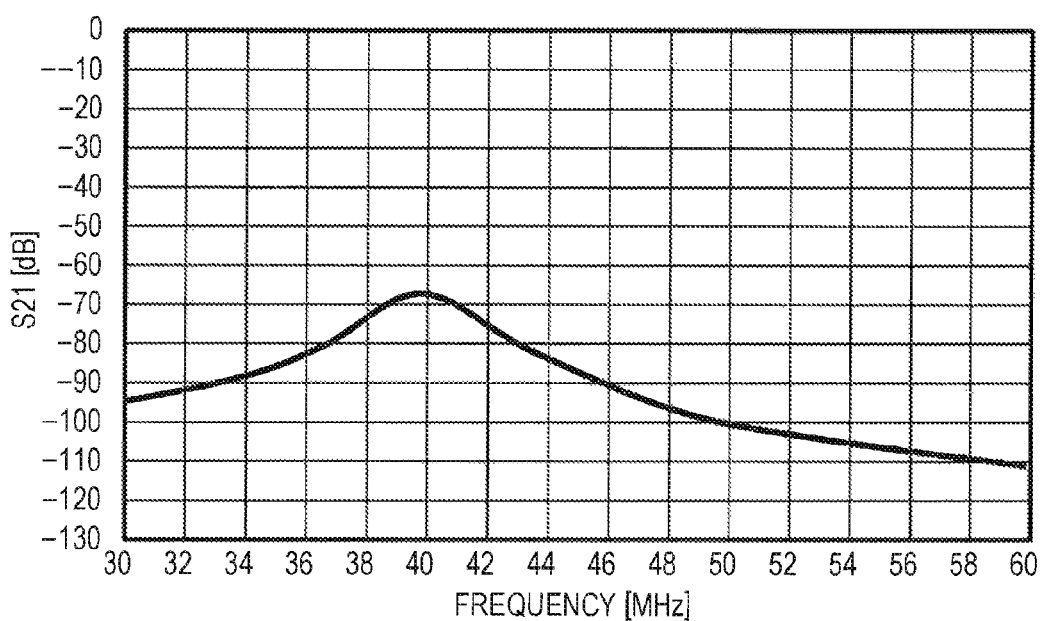
FIG. 22 is a diagram showing the result of a three-dimensional electromagnetic field simulation performed to measure the coupling strength S21 [dB] between the electrode of the transmitting side and the electrode of the receiving side when two electrode units 1610 having resonant structures are placed on a human body model (L1=0.88 µH, C1=100 pF).
Figure 23:
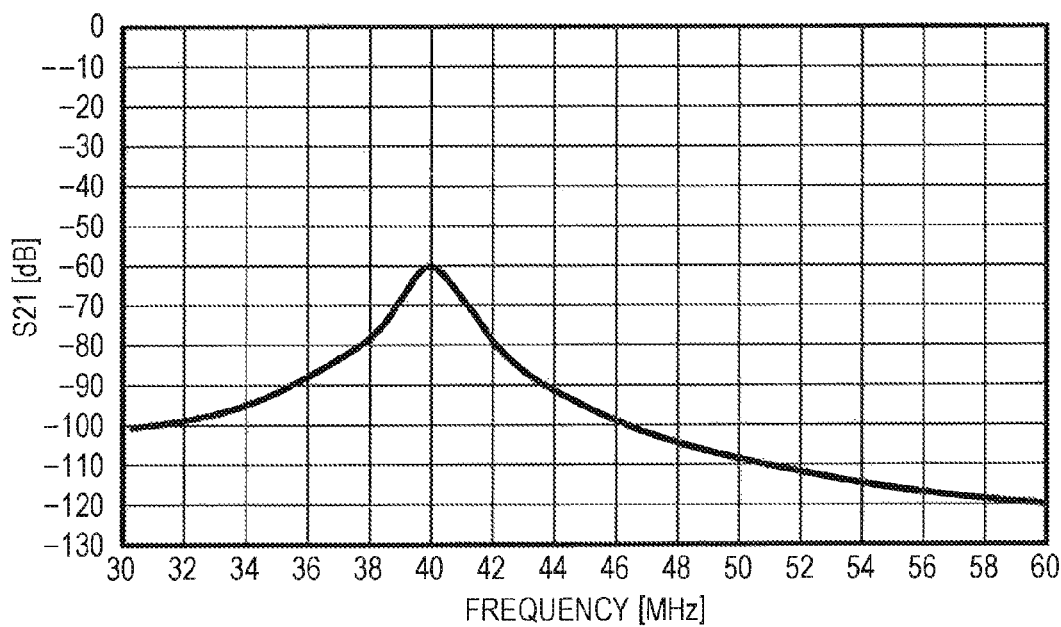
FIG. 23 is a diagram showing the result of a three-dimensional electromagnetic field simulation performed to measure the coupling strength S21 [dB] between the electrode of the transmitting side and the electrode of the receiving side when two electrode units 1610 having resonant structures are placed on a human body model (L1=0.85 µH, C1=200 pF).
Figure 24:
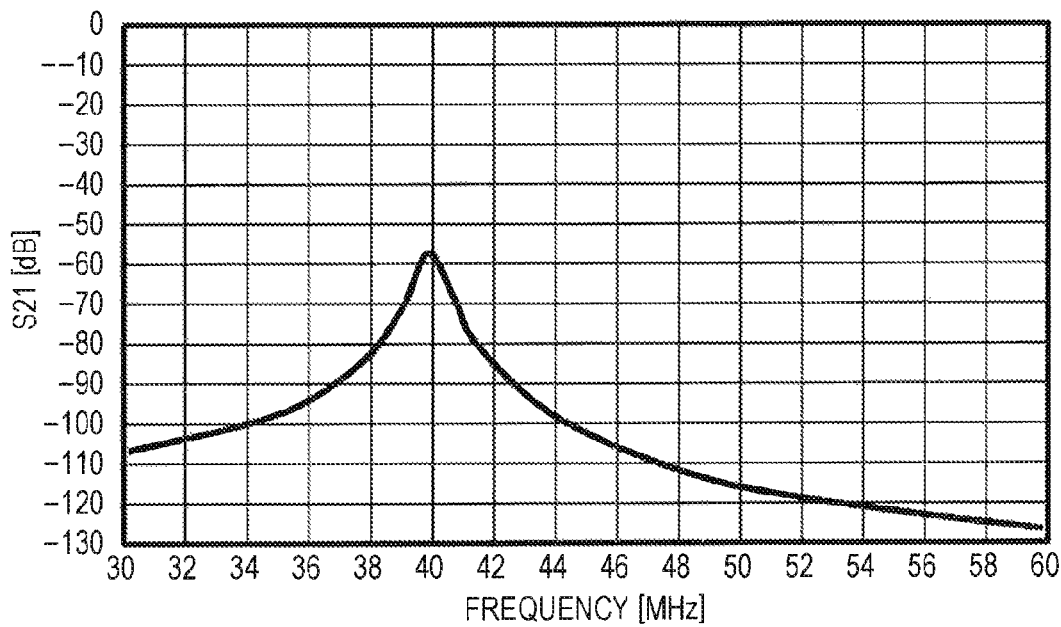
FIG. 24 is a diagram showing the result of a three-dimensional electromagnetic field simulation performed to measure the coupling strength S21 [dB] between the electrode of the transmitting side and the electrode of the receiving side when two electrode units 1610 having resonant structures are placed on a human body model (L1=0.83 µH, C1=300 pF).
Figure 25:
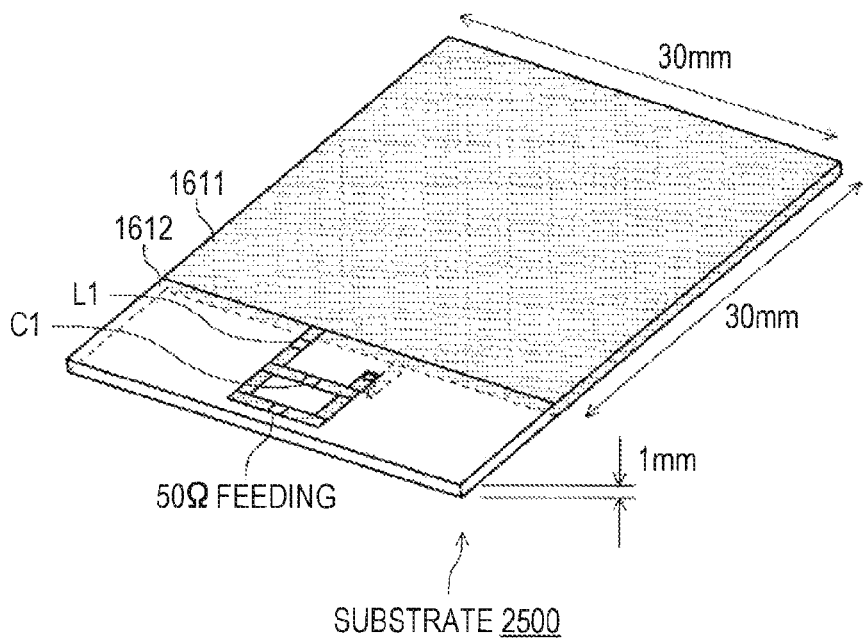
FIG. 25 is a diagram showing the analysis model used in three-dimensional electromagnetic field simulations performed to measure the coupling strength S21 [dB] between electrodes.

FIGS. 21 through 24 show the results of three-dimensional electromagnetic field simulations performed to measure the coupling strength S21 [dB] between the electrode of the transmitting side and the electrode of the receiving side when two electrode units 1610 having resonant structures are placed on a human body model. In FIG. 25, FIG. 25 shows the specific structure of the electrode model that is used on the transmitting side and the receiving side in the three-dimensional electromagnetic field simulations (power being fed from the communication processing unit 1630 with a characteristic impedance of 50Ω). The two electrodes 1621 and 1622 are perfect conductors of 30×30×0.04 mm, and are provided on the upper and lower surfaces of a substrate 2500 that is 1.0 mm in thickness, 2.2 in relative permittivity $\in_r$', and 0.001 in tan δ. The inductor L1 and the capacitor C1 constituting the resonant circuit unit 120 are modeled on a wiring pattern formed with a perfect conductor of 1.0 mm in line width on the upper surface of the substrate 1300. The human body model is the same as that shown in FIG. 14. FIG. 21 shows the result of a simulation in which L1=0.76 μH and C1=0.1 pF, FIG. 22 shows the result of a simulation in which L1=0.88 μH and C1=100 pF, FIG. 23 shows the result of a simulation in which L1=0.85 μH and C1=200 pF, and FIG. 211 shows the result of a simulation in which L1=0.83 μH and C1=300 pF.

Figure 50:
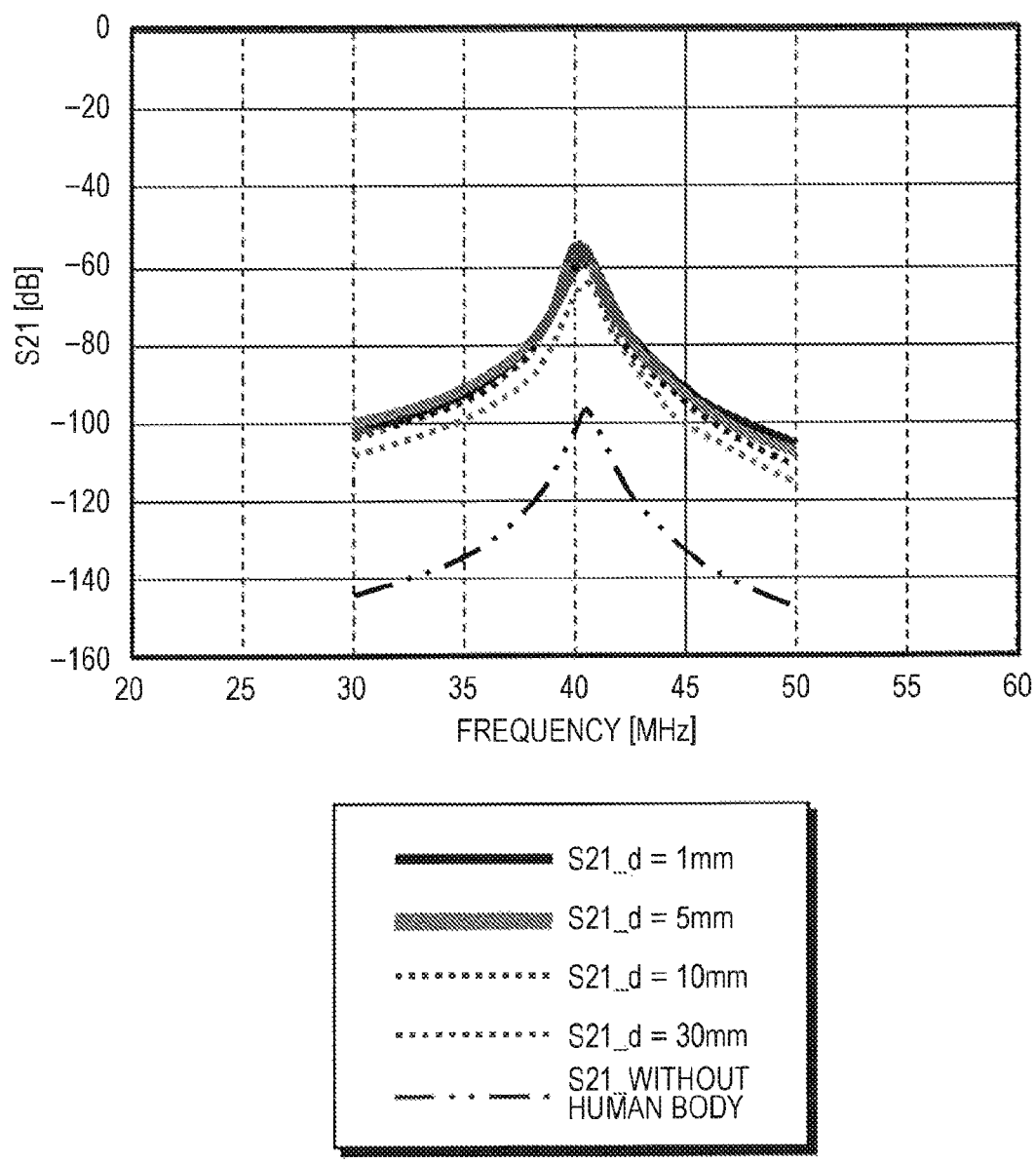
FIG. 50 is a diagram showing the results of three-dimensional electromagnetic field simulations performed to measure the coupling strength S21 [dB] while the distance d between a human body and each of the electrodes of the transmitting side and the receiving side.

As can be seen from the results shown in FIGS. 21 through 24, where the value of the capacitance of the capacitor C1 connected in parallel to the electrode unit 1610 and the first resonant circuit 1621 is larger, the peak value of the coupling strength S21 [dB] between the two electrodes is larger. Also, the waveforms of the coupling strengths S21 [dB] tend to be similar to the respective waveforms of the voltage ratios V2/V1 shown in FIGS. 17 through 20. Moreover, as a result of three-dimensional electromagnetic field simulations performed to measure the coupling strength S21 [dB] while L1 was fixed at 0.88 [μH], C1 was fixed at 200 [pF], and the distance d between the human body and each of the electrodes of the transmitting side and the receiving side were changed between 1 mm and 30 mm, it became apparent that the resonant frequency hardly varied when the human body came close (see FIG. 50). This is because of the resonant circuit structure that used the electrode terminals 1611 and 1612 formed with parallel plates as capacitors.

Figure 26:
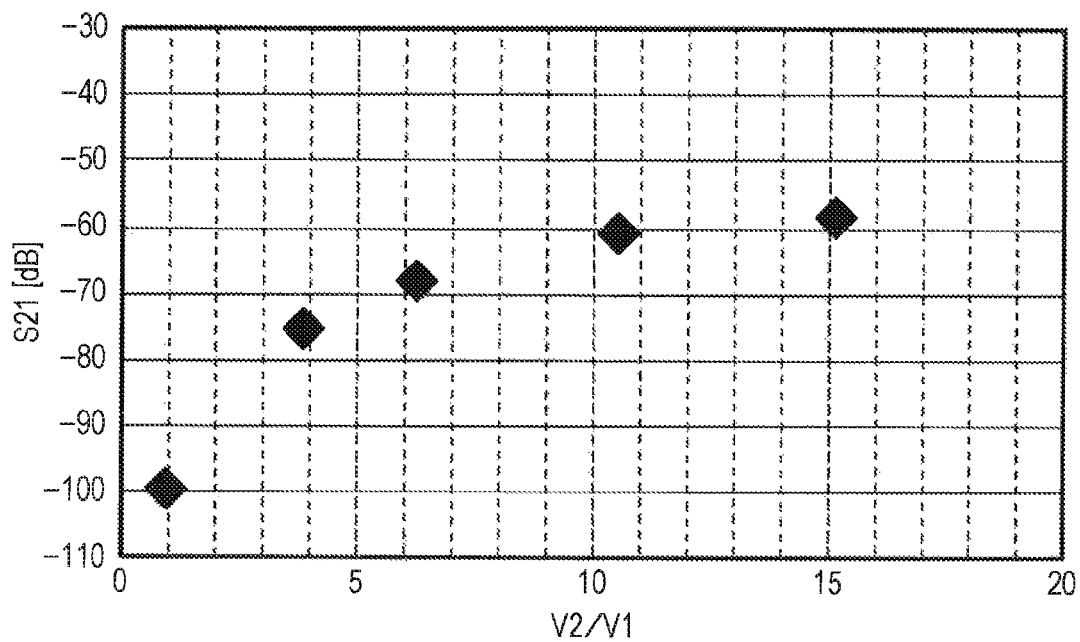
FIG. 26 is a diagram showing the relationship between the voltage ratios V2/V1 shown in FIGS. 17 through 20 and the coupling strengths S21 [dB] shown in FIGS. 21 through 24.

FIG. 26 shows the relationship between the voltage ratios V2/V1 shown in FIGS. 17 through 20 and the coupling strengths S21 [dB] shown in FIGS. 21 through 24. As can be seen from FIG. 15, the coupling strength S21 [dB] between the electrodes tends to increase as the voltage ratio V2/V1 becomes higher. Also, while the voltage ratio V2/V1 is 1 in the structure of a parallel resonant circuit (see FIG. 47) that has an inductor connected in parallel to electrodes formed with two conductor plates, the coupling strength S21 between the two electrodes increases by approximately 30 dB in the resonant circuit structure shown in FIG. 16 with the voltage ratio V2/V1 of 5.0.

Figure 27:
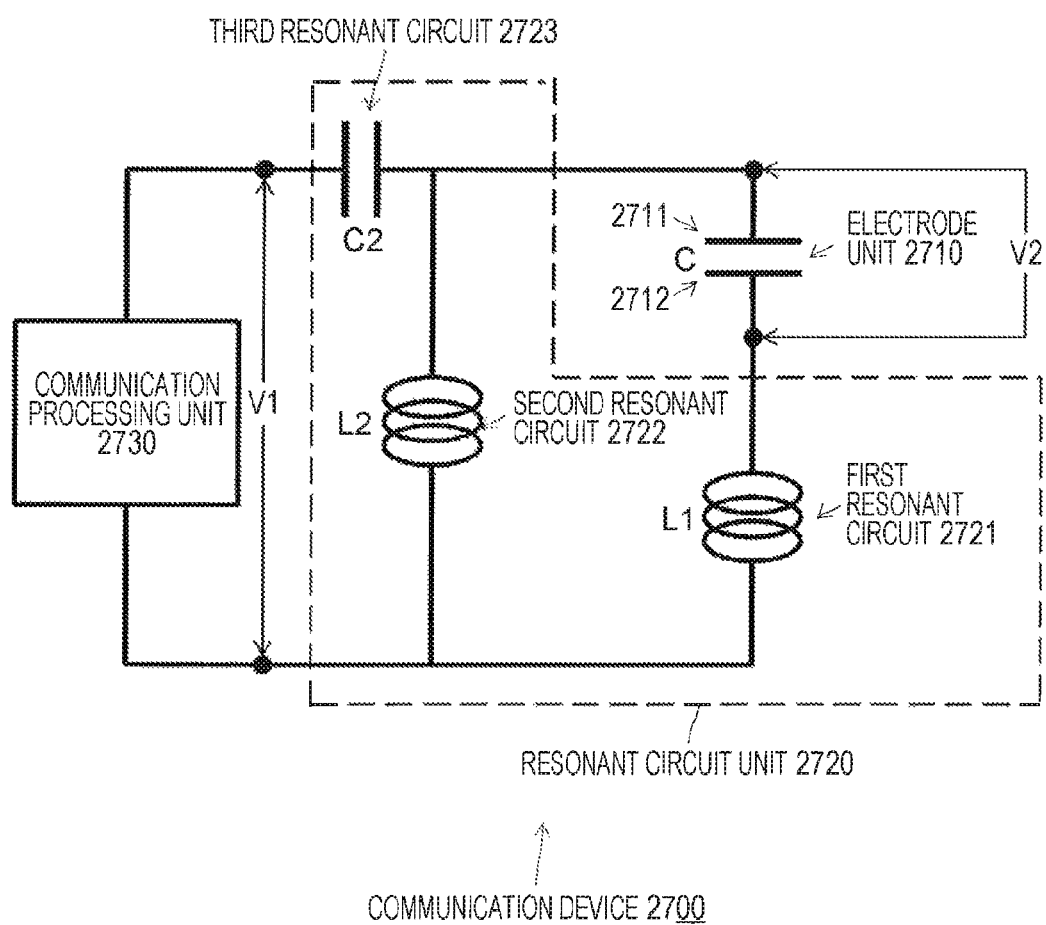
FIG. 27 is a diagram showing the structure of a communication device 2700 using resonant circuits that cause series resonance.

Although FIGS. 1 and 16 show example structures of communication devices using resonant circuits that cause parallel resonance, resonant circuits to which the technology disclosed in this specification can be applied are not limited to them. FIG. 27 shows the structure of a communication device 2700 using resonant circuits that cause series resonance.

An electrode unit 2710 is formed with a combination of a first electrode terminal 2711 and a second electrode terminal 2712 that are placed to face each other, and the capacitance thereof is represented by C.

A resonant circuit unit 2720 includes a first resonant circuit 2721 that is formed with a single inductor and is connected in series to the electrode unit 2710. The resonant circuit unit 2720 also includes a second resonant circuit 2722 that is formed with a single inductor and is connected in parallel to the electrode unit 2710 and the first resonant circuit 2721, which are connected in series.

So as to form a series resonant circuit at a target frequency (40 MHz, for example), the resonant circuit unit 2720 further includes a third resonant circuit 2723 connected in series to excitation sources that are the electrode unit 2710 and the first resonant circuit 2721 connected in series, and the second resonant circuit 2722 connected in parallel to the electrode unit 2710 and the first resonant circuit 2721. The third resonant circuit 2723 is formed with a single capacitor C2 in the example shown in the drawing, but may include another resonant circuit in some other cases.

Figure 28:
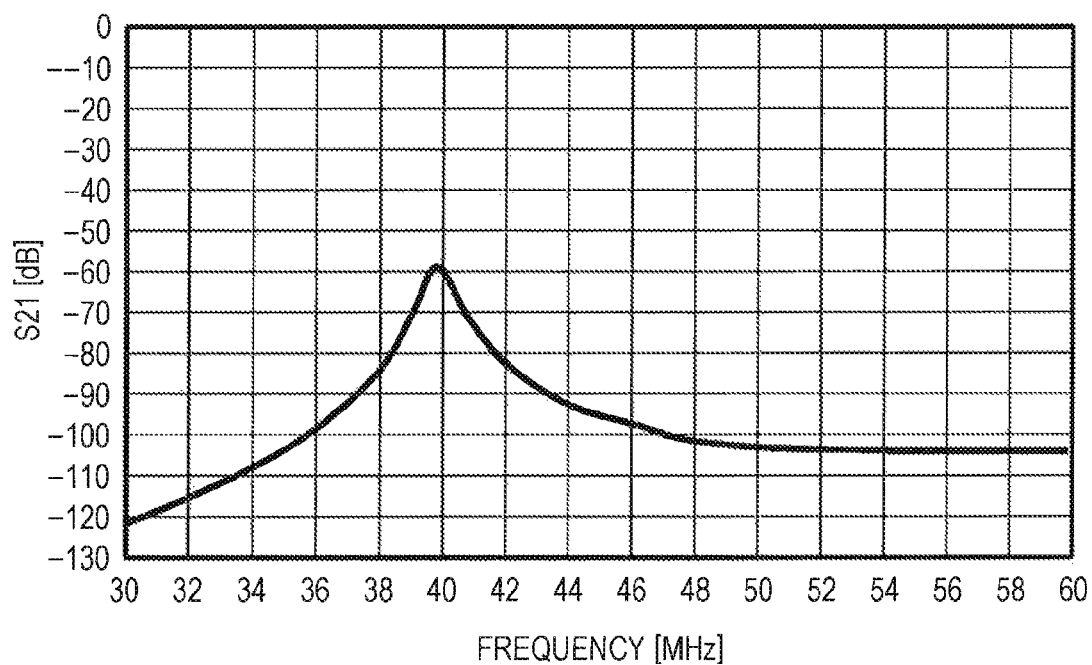
FIG. 28 is a diagram showing the result of a three-dimensional electromagnetic field simulation performed to measure the coupling strength S21 [dB] between the electrode of the transmitting side and the electrode of the receiving side when two electrode units 2710 having series resonant structures are placed on a human body model.

FIG. 28 shows the result of a three-dimensional electromagnetic field simulation performed to measure the coupling strength S21 [dB] between the electrode of the transmitting side and the electrode of the receiving side when two electrode units 2710 having series resonant structures are placed on a human body model. Here, an inductor L1 of 0.3 μH is connected in series to each electrode unit 1710 having a capacitance C, an inductor L2 of 0.37 μH is connected in parallel to each electrode unit 2710, and a capacitor C2 of 10 pF is connected in series to the excitation sources, so as to form a series resonant circuit. The electrode model, the human body model, and the two electrode units 2710 are arranged in the same manner as in FIGS. 13 and 14.

As can be seen from FIG. 28, in a case where the electrode unit 2710 having a series resonant structure is used, the coupling strength S21 between the two electrodes increases by approximately 40 dB, compared with the coupling strength in the case of a parallel resonant circuit (see FIG. 47) that does not apply an inductor to the electrode unit formed with two conductor plates (the maximum value of the voltage ratio V2/V1 is 1 in this case). Accordingly, a high coupling strength S21 [dB] is achieved at the target frequency of 40 MHz, as in the case where the electrode unit 110 or 1610 having a parallel resonant structure shown in FIG. 1 or 16 is used. The result of a circuit simulation performed to measure the voltage ratio V2/V1 in the communication device 2700 using the electrode unit 2710 having a series resonant structure shows that V2/V1>10.

Figure 29:
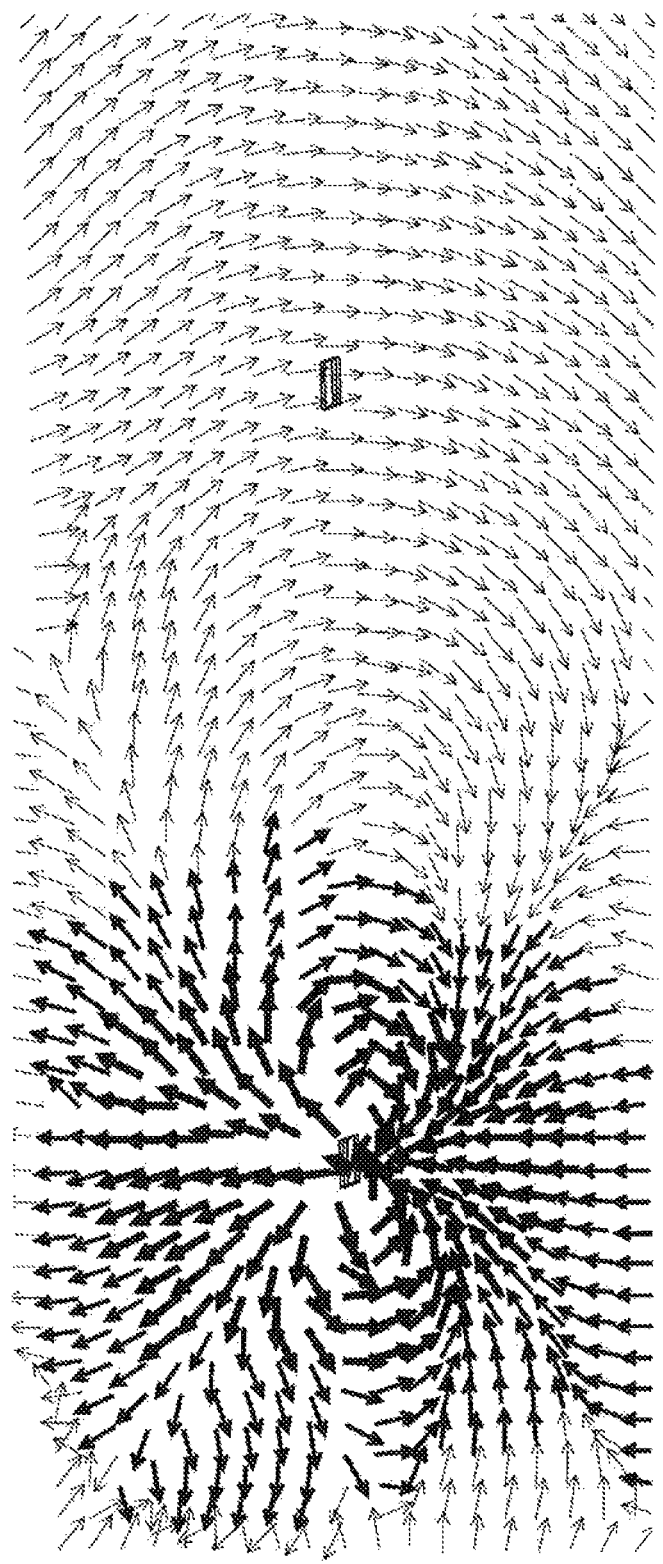
FIG. 29 is a diagram showing the result of a three-dimensional electromagnetic field simulation (without a human body) performed to measure the field distribution depending on the existence/non-existence of a human body between the electrode of the transmitting side and the electrode of the receiving side in a communication system that includes two electrode units 1610 having parallel resonant structures.
Figure 30:
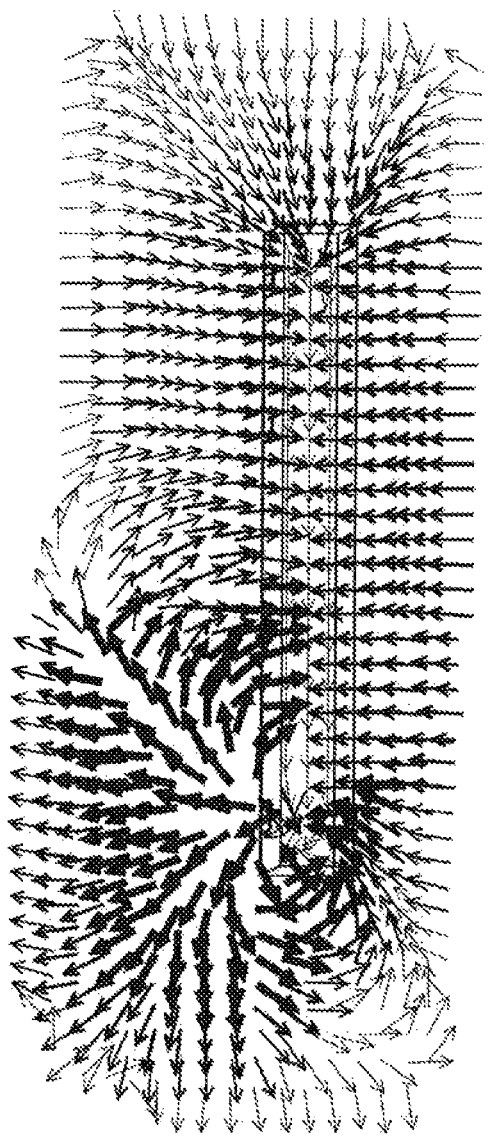
FIG. 30 is a diagram showing the result of a three-dimensional electromagnetic field simulation (with a human body) performed to measure the field distribution depending on the existence/non-existence of a human body between the electrode of the transmitting side and the electrode of the receiving side in a communication system that includes two electrode units 1610 having parallel resonant structures.

FIGS. 29 and 30 show the results of three-dimensional electromagnetic field simulations performed to measure the field distribution depending on the existence/non-existence of a human body between the electrode of the transmitting side and the electrode of the receiving side in a communication system that includes two electrode units 1610 having parallel resonant structures. Here, an inductor L1 of 0.08 µH is connected in series to each electrode unit 1610 having a capacitance C, a capacitor C1 of 200 pF is connected in parallel to each electrode unit 1610 and the inductor L1 connected in series, and resonance is caused at the target frequency of 40 MHz. The electrode model is the same as that shown in FIG. 25. The human body model in a case where a human body exists is also the same as that shown in FIG. 14, and the distance between the electrode unit 1610 and the human body is 5 mm on both the transmitting and receiving sides.

FIG. 29 shows the field distribution in a case where a human body does not exist, and FIG. 30 shows the field distribution in a case where a human body exists. In each of the drawings, the orientations of the arrows indicate the orientations of the electric field (the electric field vector) in a certain phase at 40 MHz, and the thicknesses of the arrows indicate electric field intensities.

As can be seen from FIG. 29, in a case where a human body does not exist as a communication path medium between the electrode of the transmitting side and the electrode of the receiving side, or where communication is conducted only with the two electrodes, an electric field is generated in the vicinity of one electrode (the transmitting side), but this electric field does not propagate through space (or is not emitted as if from an antenna), and the field coupling to the other electrode (the receiving side) is weak.

As can be seen from FIG. 30, in a case where a human body exists as a communication path medium between the electrode of the transmitting side and the electrode of the receiving side, on the other hand, the electric field generated in the vicinity of one electrode (the transmitting side) propagates through space, being attracted toward the human body. As a result, the field coupling to the other electrode the receiving side) becomes stronger.

Figure 31:
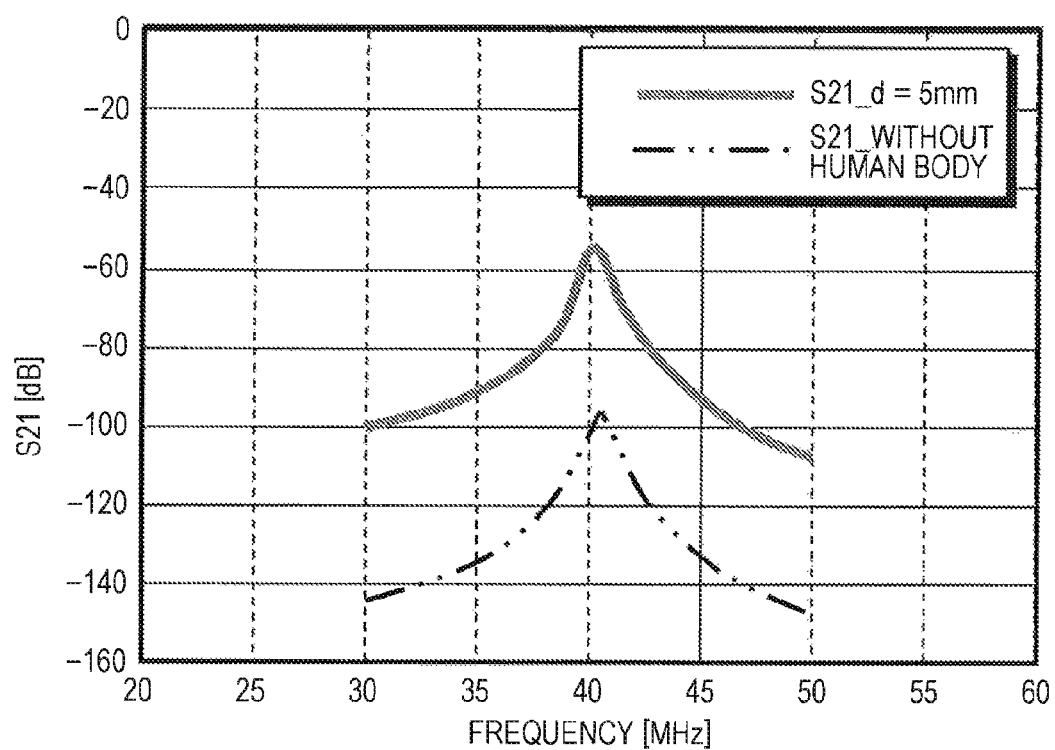
FIG. 31 is a diagram showing the coupling strength S21 [dB] depending on the existence/non-existence of a human body between two electrodes in a communication system that includes two electrode units 1610 having parallel resonant structures.

FIG. 31 shows the coupling strength S21 [dB] depending on the existence/non-existence of a human body between two electrodes in a communication system that includes two electrode units 1610 having parallel resonant structures. In a case where a human body exists, the distance d between the human body and each of the electrodes of the transmitting side and the receiving side is 5 mm. As can be seen from the drawing, the coupling strength S21 between the electrodes increases by approximately 40 dB, because a human body exists in the communication path. Also, the peak of the coupling strength S21 [dB] between the two electrodes hardly changes from the target frequency of 40 MHz, regardless of the existence/non-existence of a human body. This is the principle of intra-body communication in the communication device 1600 that includes the electrode unit 1610 formed with two flat-plate conductor and the resonant circuit unit 1620, and is designed so that the voltage V2 to be applied to the electrode unit 1610 becomes higher than the input voltage V1.

As already mentioned above, a communication system to which the technology disclosed in this specification is applied (see FIG. 2, for example) can also be used in short-range communication that does not involve a human body in a communication path.

Figure 32:
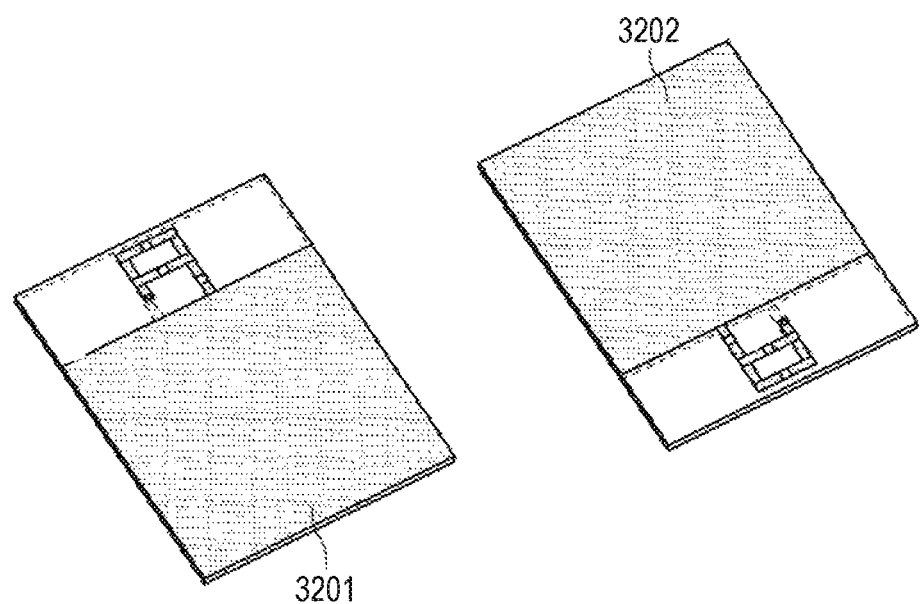
FIG. 32 is a diagram showing an example of a short-range communication system in which two electrodes each formed with the electrode model shown in FIG. 25 are horizontally arranged at a distance of 20 mm from each other.
Figure 33A:
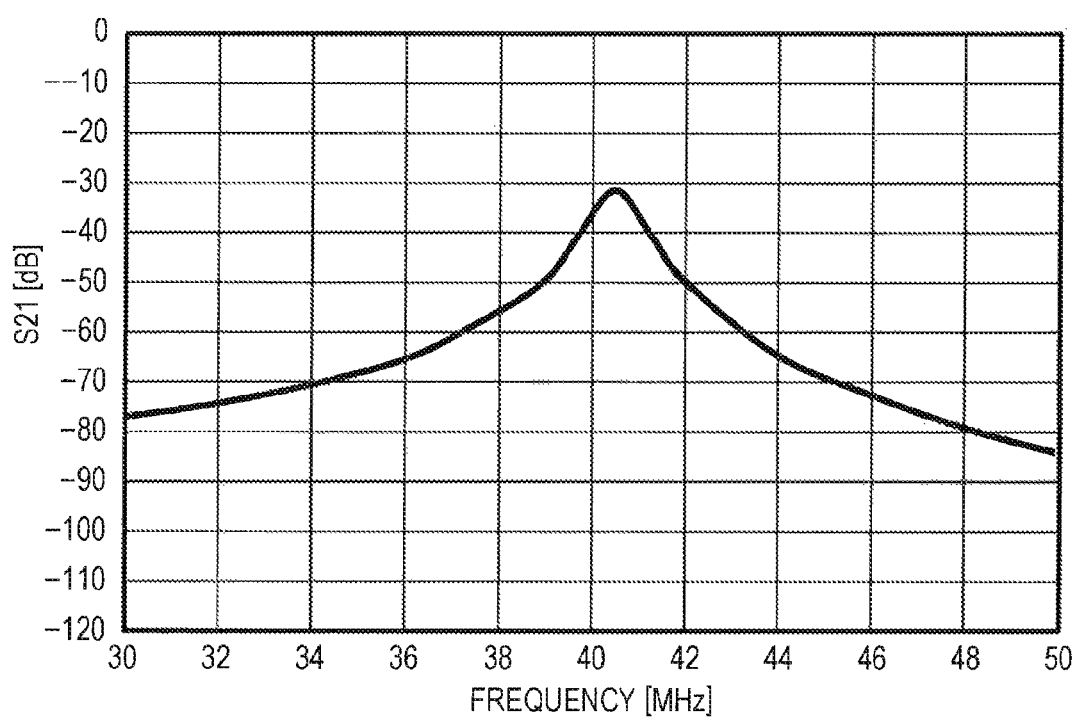
FIG. 33A is a diagram showing the result of a three-dimensional electromagnetic field simulation performed to measure the coupling strength S21 [dB] between the two electrodes in the short-range communication system shown in FIG. 32.
Figure 33B:
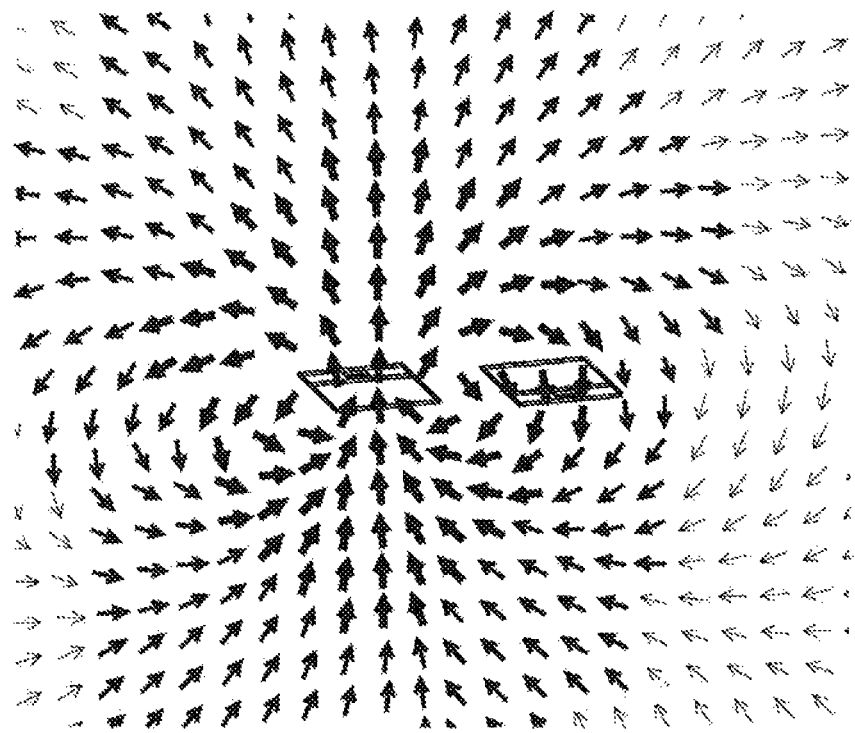
FIG. 33B is a diagram showing the result of a circuit simulation performed to measure the field distribution between the two electrodes in the short-range communication system shown in FIG. 32.

FIG. 32 shows an example of a short-range communication system in which two electrodes 3201 and 3202 each formed with the electrode model shown in FIG. 25 are horizontally arranged at a distance of 20 mm from each other. FIG. 33A shows the result of a three-dimensional electromagnetic field simulation performed to measure the coupling strength S21 [dB] between the two electrodes 3201 and 3202 in the short-range communication system shown in FIG. 32. As can be seen from FIG. 33A, the coupling strength S21 has its peak (−32 dB) in the vicinity of the target frequency of 40 MHz. FIG. 33B shows the result of a three-dimensional electromagnetic field simulation performed to measure the field distribution between the two electrodes 3201 and 3202 in the above case.

Figure 34:
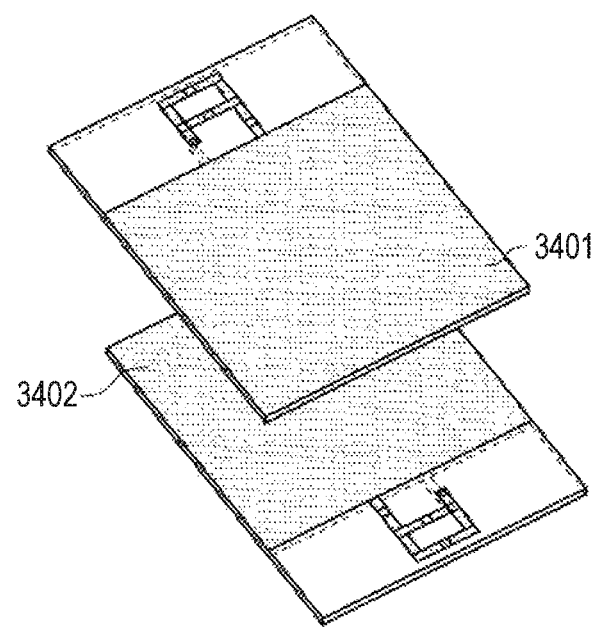
FIG. 34 is a diagram showing an example of a short-range communication system in which two electrodes each formed with the electrode model shown in FIG. 25 are vertically arranged at a distance of 20 mm from each other.
Figure 35A:
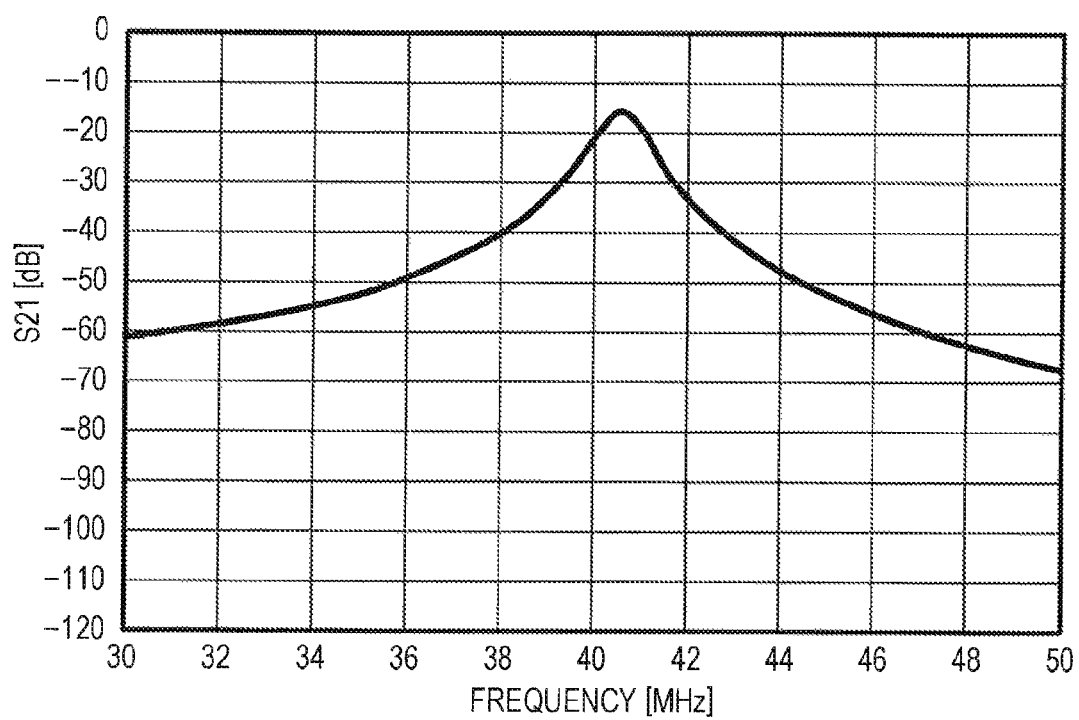
FIG. 35A is a diagram showing the result of a three-dimensional electromagnetic field simulation performed to measure the coupling strength S21 [dB] between the two electrodes in the short-range communication system shown in FIG. 34.
Figure 35B:
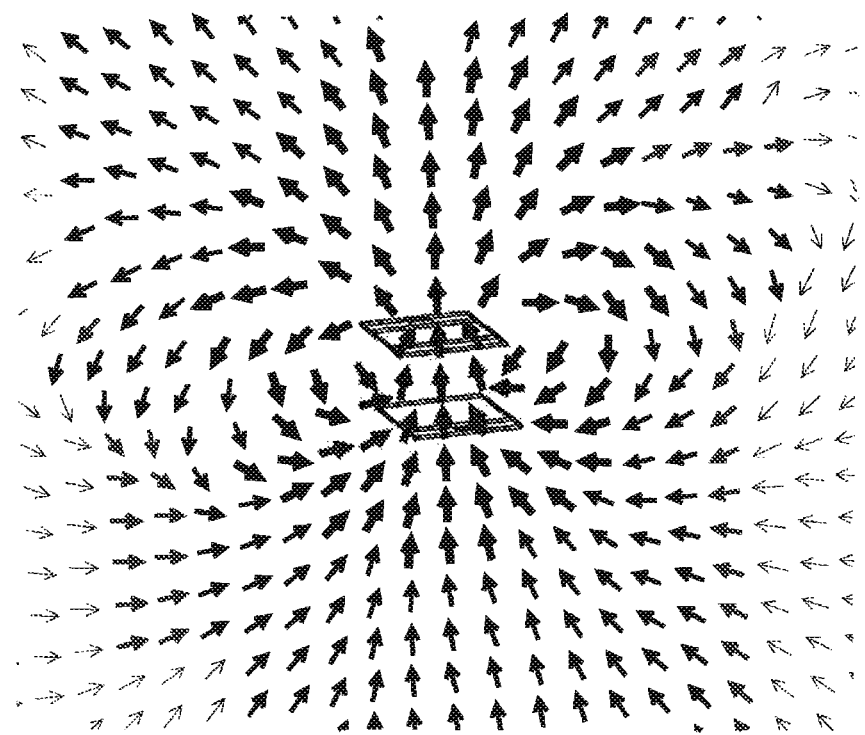
FIG. 35B is a diagram showing the result of a circuit simulation performed to measure the field distribution between the two electrodes in the short-range communication system shown in FIG. 34.

FIG. 34 shows an example of a short-range communication system in which two electrodes 3401 and 3402 each formed with the electrode model shown in FIG. 25 are vertically arranged at a distance of 20 mm from each other. FIG. 35A shows the result of a three-dimensional electromagnetic field simulation performed to measure the coupling strength S21 [dB] between the two electrodes 3401 and 3402 in the short-range communication system shown in FIG. 33. As can be seen from FIG. 35, the coupling strength S21 has its peak (−16 dB) in the vicinity of the target frequency of 40 MHz. FIG. 35B shows the result of a three-dimensional electromagnetic field simulation performed to measure the field distribution between the two electrodes 3401 and 3402 in the above case.

As a high electric field intensity is obtained near an electrode having a resonant structure, such two electrodes are placed close to cacti other so as to increase the coupling strength S21 [dB] between the two electrodes as shown in FIGS. 33A and 35A. Accordingly, where devices that include electrodes having resonant structures are placed at a short distance from each other, near field communication or wireless power transmission using field coupling can be conducted.

Example 2

In Example 1 described above, intra-body communication or short-range communication is conducted on the basis of the fact that a high electric field intensity is obtained near an electrode having a resonant structure, and the coupling strength S21 becomes higher when a human body is interposed between such two electrodes, or such two electrodes are placed at a short distance from each other.

However, with a single electrode (equivalent to the receiving side of a communication system), the coupling strength S21 can also increase, and receiving sensitivity can become higher. With this fact being taken into consideration, an electrode having a resonant structure may be used as a probe for sensing electric fields in some examples.

In the recent trend of network usage, electronic devices equipped with communication functions such as Wi-Fi (a registered trade name), Bluetooth (a registered trade name), and GPS (Global Positioning System) have been spreading widely. Typical examples or such electronic devices are mobile terminals such as portable telephone devices and smartphones. With such a fact in the background, it is imperative to cope not only with EMI (Electromagnetic Interference) that restricts unnecessary electromagnetic fields (noise) generated from electronic devices to the surroundings, but also with the problem of in-device interference (also called self-poisoning or RFI (Radio Frequency Interference)) caused by an unnecessary electromagnetic field affecting other wireless characteristics in the same electronic device.

So as to cope with EMI and in-device interference, the following measures are normally taken. The source of noise generation, the source of noise transmission, and the source of noise radiation are identified, and the source of noise generation is shielded. Alternatively, a capacitor or an inductor is used at the source of noise transmission, to cut noise.

In identifying the source of noise generation, the source of noise transmission, and the source of noise radiation, a magnetic field probe having a signal line and a GND line connected in a loop-like form is mainly used. When the magnetic field probe is brought close to a current containing noise, the intensity of the magnetic field vertically entering this loop can be sensed, and the frequency characteristics and the intensity of the noise can be analyzed.

It is normally possible to cope with EMI, if noise of −100 dBm or higher can be detected. This level of noise can be appropriately measured with an amplifier and a magnetic field probe. In view of in-device interference, however, there are wireless devices (such as a GPS) whose characteristics are greatly affected by a very small noise of −100 dBM or lower, and therefore, a measurement technique with higher sensitivity is required.

For example, there has been a suggested magnetic field probe that has a resonant structure at a certain frequency and has its sensitivity increased at the frequency (see Patent Document 3, for example). A magnetic field probe has high sensitivity in measurement when the direction of a magnetic field generated from current is perpendicular to the loop plane of the probe, and excels in identifying a noise current. However, a resonant structure having an inductor and a capacitor formed in the wiring pattern of a magnetic field probe is used. Therefore, the probe structure needs to be optimized for each target frequency and each probe size. Also, since the sensing end of the probe has a loop structure, it is difficult to detect noise in the principal component of an electric field, even it a magnetic field can be sensed. As most of the antennas of wireless devices are of a field emission type, a probe that can measure an electric field with high sensitivity is also required.

Figure 36:
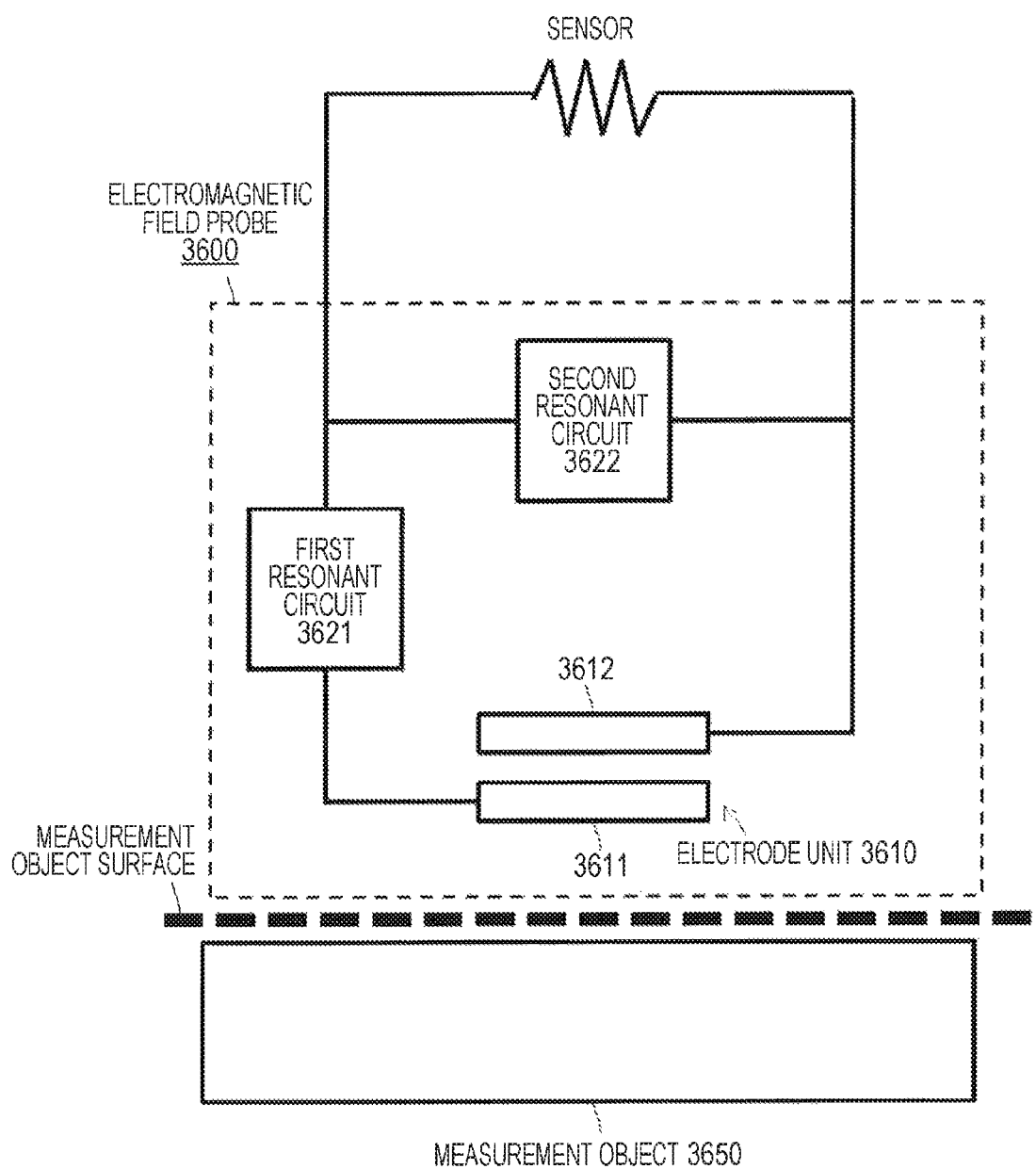
FIG. 36 is a diagram schematically showing an example structure of a noise measurement device that includes an electromagnetic field probe 3600 that uses electrodes having resonant structures.

FIG. 36 schematically shows an example structure of a noise measurement device that includes an electromagnetic field probe 3600 that uses electrodes having resonant structures according to the technology disclosed in this specification.

The electromagnetic field probe 3600 includes an electrode unit 3610 formed with a combination of a first electrode terminal 3611 and a second electrode terminal 3612. Each of the first electrode terminal 3611 and the second electrode terminal 3612 is formed with a conductor plate, and are placed to face each other at the sensing end of the probe. As shown in FIG. 36, when the sensing end of the probe is brought close to a measurement object 3650, a noise level can be sensed based on the voltage that is applied between the electrode terminals 3611 and 3612 as the vertical electric field emitted from the measurement object passes through the first electrode terminal 3611 and the second electrode terminal 3612.

So as to increase the detection sensitivity using a resonant structure, the electromagnetic field probe 3600 may include a resonant circuit unit 3620.

The resonant circuit unit 3620 includes a first resonant circuit 3621 that is connected in series to the electrode unit 3610. The first resonant circuit 3621 is formed with one or more inductors, for example, and the constant of the inductor (s) is determined so as to form a resonant circuit at a target frequency.

So as to further increase the detection sensitivity using a parallel resonant structure, the resonant circuit unit 3620 may further include a second resonant circuit 3622 that is connected in parallel to the electrode unit 3610 and the first resonant circuit unit 3621, which are connected in series. The second resonant circuit 3622 is formed with one or more inductors, or one or more capacitors, and the constant of the inductor(s) or the capacitor(s) is determined so as to form a resonant circuit at the target frequency.

The resonant circuit unit 3620 is formed as a substrate-mounted component together with the electrode unit 3610, so that the electromagnetic field probe 3600 can be readily made to become a resonant circuit at the target frequency, and the resetting in accordance with the target frequency and the probe size becomes unnecessary.

The structure of the resonant circuit unit 3620 in which the first resonant circuit 3621 is connected in series to the electrode unit 3610, the second resonant circuit 3622 is connected in parallel to the electrode unit 3610, and a substrate-mounted component is used in doing so, can also be applied to a magnetic field probe.

Figure 37:
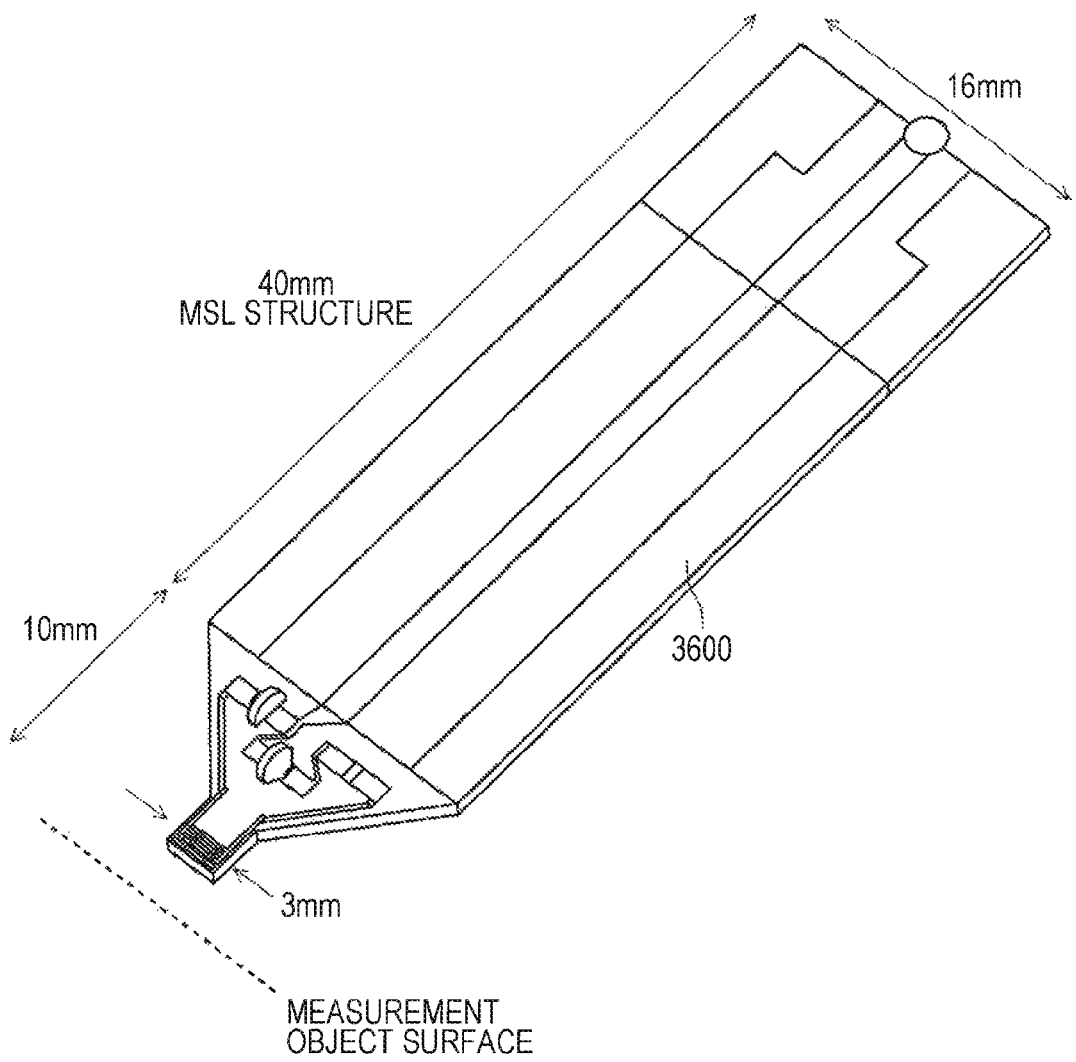
FIG. 37 is an external view of an entire model of the electromagnetic field probe 3600 having a microstrip line structure.
Figure 38:
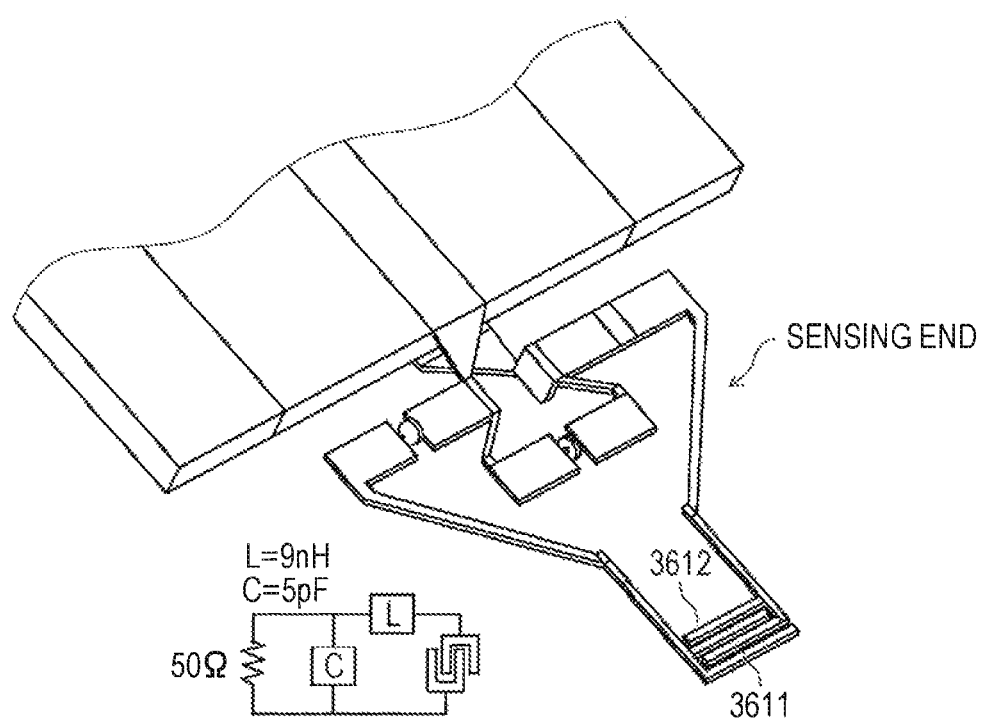
FIG. 38 is a diagram showing only the metal patterns at the sensing end of the electromagnetic field probe 3600 shown in FIG. 37.

FIG. 37 is an external view of an entire model of the electromagnetic field probe 3600 having a microstrip line structure. FIG. 38 shows only the metal patterns at the sensing end of the electromagnetic field probe 3600 shown in FIG. 37. As shown in FIG. 37, the electrode unit 3610 and the resonant circuit unit 3620 are formed as metal patterns on a dielectric substrate. The size of the sensing end of the electromagnetic field probe is 3 mm in width.

As shown in FIG. 38, at the sensing end of the electromagnetic field probe 3600, the electrode terminals 3611 and 3612 formed with two comb-like metal patterns are arranged so as to be parallel to the measurement object surface and so as not to overlap each other. FIG. 38 also shows an equivalent circuit. The electrode terminal 3611 having a comb-like form is connected in series to an inductor L of 9 nH as the first resonant circuit 3621, and is further connected to a signal line of a microstrip line having a length of 40 mm. Between the other electrode terminal 3612 and the GND pattern (not shown) on the bottom surface of the substrate, a capacitor of 5 pF is connected as the second resonant circuit 3622. The thickness of the dielectric substrate is 0.8 mm, and the permittivity is 4.2.

Figure 39:
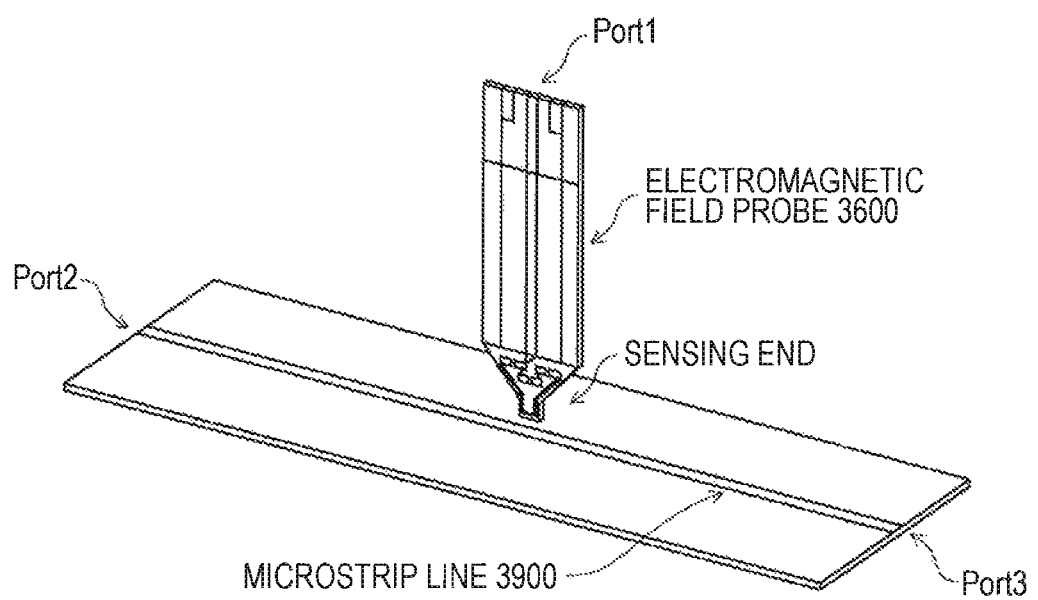
FIG. 39 is a diagram showing a characteristics analysis model of the electromagnetic field probe 3600 shown in FIGS. 37 and 38.

FIG. 39 shows a characteristics analysis model of the electromagnetic field probe 3600 shown in FIGS. 37 and 38. As shown in the drawing, the sensing end of the electromagnetic field probe 3600 is placed on a microstrip line 3900 as the measurement object, and an electromagnetic field generated from the microstrip line 3900 is sensed with the electromagnetic field probe 3600. In the example shown in the drawing, the sensing end of the electromagnetic field probe 3600 is parallel to the longitudinal direction of the microstrip line 3900. The distance between the microstrip line 3900 and the sensing end of the electromagnetic field probe 3600 is 2 mm. The upper end Port1 of the electromagnetic field probe 3600, and both ends Port2 and Port3 of the microstrip line 3900 are set at 50 Ω.

FIG. 40 shows results of characteristics of the respective ports Port1 through Port3 in the characteristics analysis model shown in FIG. 39. The reflection characteristics at Port1 are S11 characteristics of the electromagnetic field probe 3600. As can be seen from FIG. 40, the electromagnetic field probe 3600 of the characteristics analysis model has resonance in the vicinity of 1.58 GHz. The reflection characteristics at Port2 are S22 characteristics of the electromagnetic field probe 3600. As can be seen from FIG. 40, the characteristic impedance of the microstrip line 3900 of the characteristics analysis model is also 50Ω. The transmission characteristics between Port1 and Port2 are the characteristics of the coupling strength S21 between the microstrip line 3900 and the electromagnetic field probe 3600. As can be seen from FIG. 40, the S21 characteristics greatly increase at the resonant frequency of the electromagnetic field probe 3600, and the electromagnetic field coupling between the microstrip line 3900 and the electromagnetic field probe 3600 becomes stronger. That is, where the S21 characteristics are larger, the sensitivity of the electromagnetic field probe 3600 becomes higher, and the electromagnetic field probe 3600 can sense an electromagnetic field with higher sensitivity. An electromagnetic field that is generated at the microstrip line 3900 and is reflected only at a rate equivalent to 1/1000 of the reflection characteristics of the microstrip line 3900 can be almost thoroughly transmitted to the side of the electromagnetic field probe 3600.

Figure 41A:
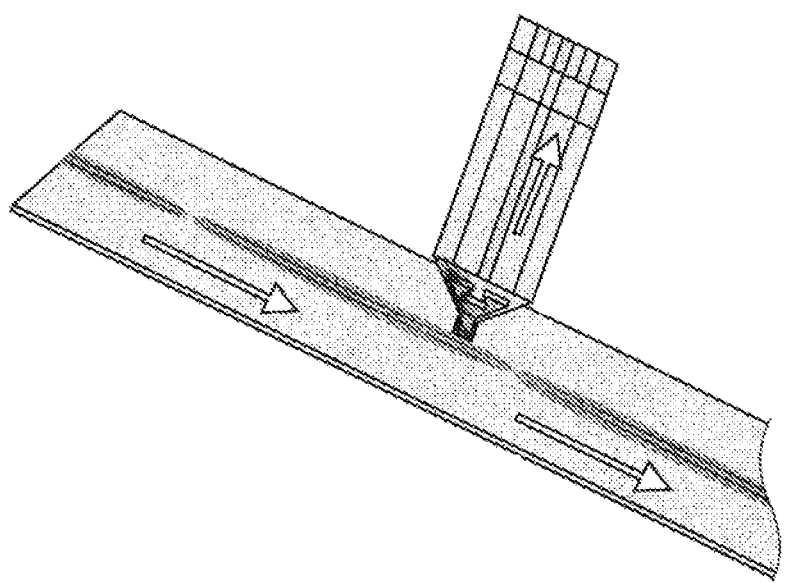
FIG. 41A is a diagram showing the field intensity distributions of the microstrip line 3900 and the (entire) electromagnetic field probe 3600 at 1.58 GHz, which is the resonant frequency of the electromagnetic field probe 3600.
Figure 41B:
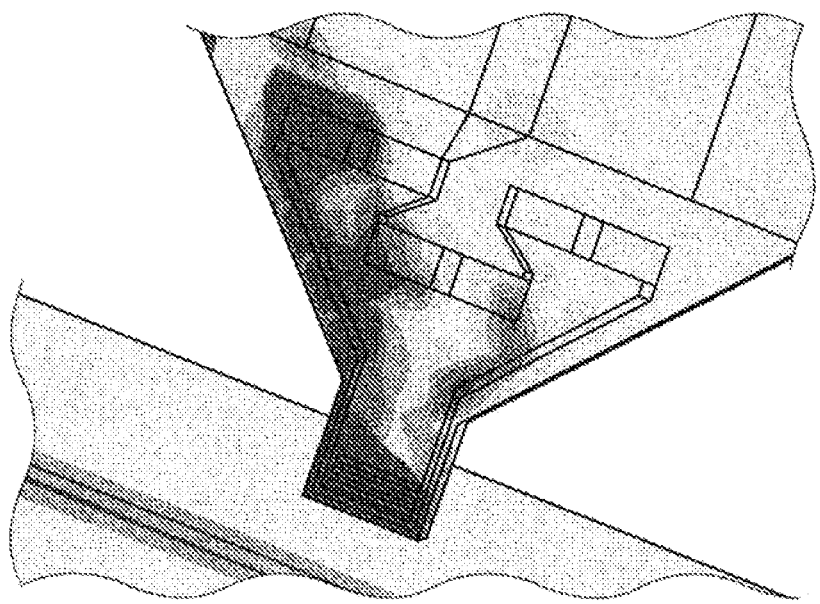
FIG. 41B is a diagram showing the field intensity distributions of the microstrip line 3900 and (the sensing end and its surrounding area of) the electromagnetic field probe 3600 at 1.58 GHz, which is the resonant frequency of the electromagnetic field probe 3600.

FIG. 41 show field intensity distributions of the microstrip line 3900 and the electromagnetic field probe 3600 at 1.58 GHz, which is the resonant frequency of the electromagnetic field probe 3600. FIG. 41A shows the entire field intensity distribution, and FIG. 41B is an enlarged view of the field intensity distribution near the sensing end of the electromagnetic field probe 3600. In FIG. 41A, the direction of the current flowing in the signal line is indicated by arrows. In each of the drawings, portions with high electric field intensities are darker in color, and portions with lower electric field intensities are lighter in color.

As shown in FIG. 41B, the electric field intensity is higher near the two comb-like electrode terminals 3611 and 3612. As is apparent from this, electric field components generated from the microstrip line 3900 are sensed with the sensing end of the electromagnetic field probe 3600.

Figure 42:
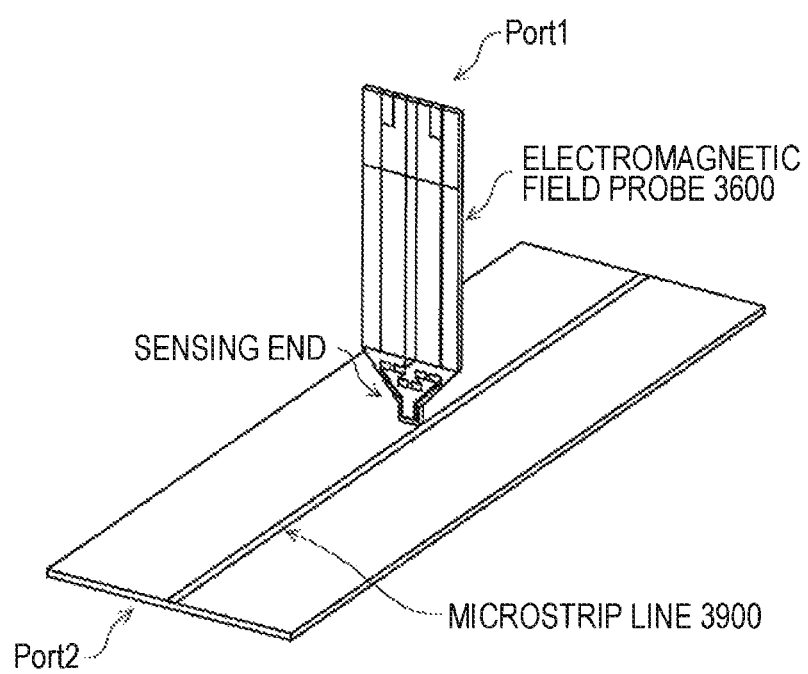
FIG. 42 is a diagram showing another characteristics analysis model of the electromagnetic field probe 3600 shown in FIGS. 37 and 38.

FIG. 42 shows another characteristics analysis model of the electromagnetic field probe 3600 shown in FIGS. 37 and 38. In the example shown in the drawing, the sensing end of the electromagnetic field probe 3600 is placed so as to be perpendicular to the longitudinal direction of the microstrip line 3900 (in other words, the orientation of the electromagnetic field probe 3600 of the model shown in FIG. 39 is rotated 90 degrees).

Figure 43:
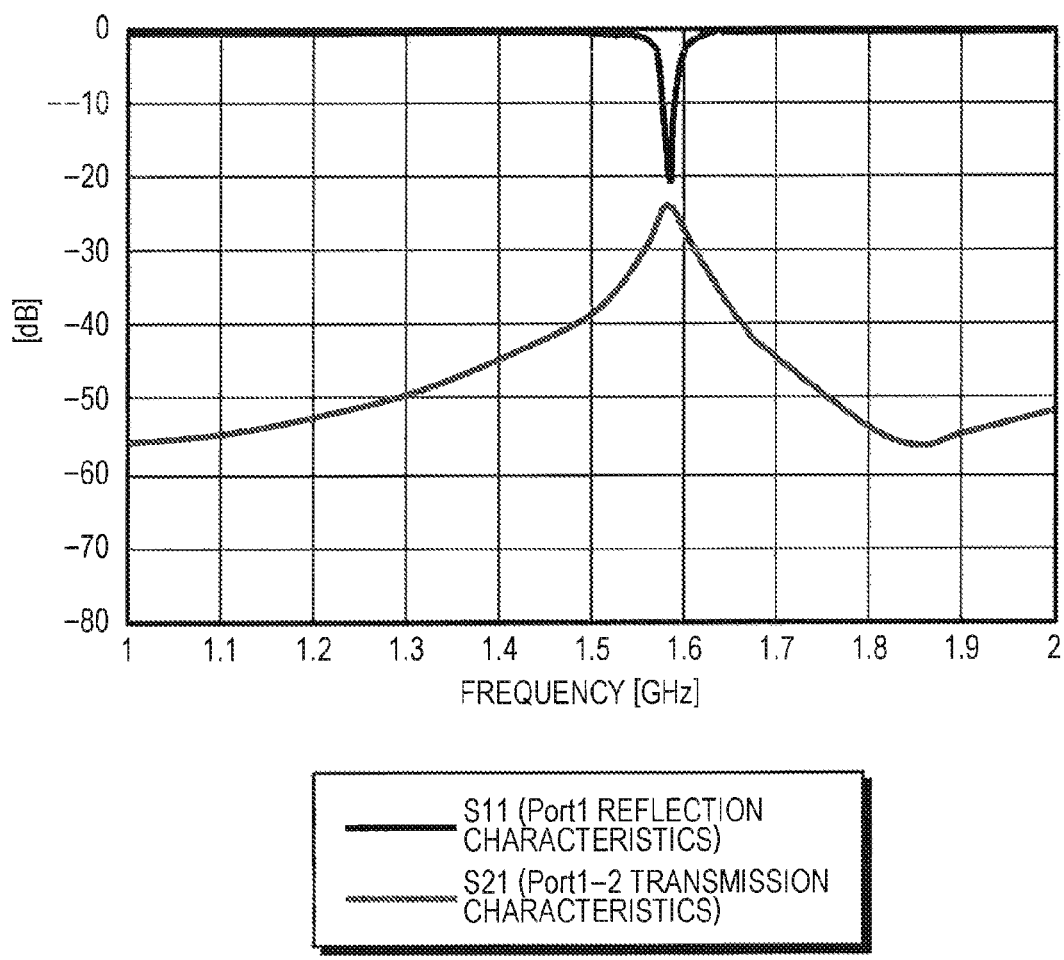
FIG. 43 is a diagram showing results of characteristics of the respective ports Port1 and Port2 in the characteristics analysis model of in FIG. 42.

FIG. 43 shows results of characteristics of the respective ports Port1 and Port2 in the characteristics analysis model shown in FIG. 42. As can be seen from FIG. 43, the electromagnetic field probe 3600 of the characteristics analysis model has resonance in the vicinity of 1.58 GHz. The transmission characteristics between Port1 and Port2 are the characteristics of the coupling strength S21 between the microstrip line 3900 and the electromagnetic field probe 3600. As can be seen from FIG. 43, the S21 characteristics greatly increase at the resonant frequency of the electromagnetic field probe 3600, and the electromagnetic field coupling between the microstrip line 3900 and the electromagnetic field probe 3600 becomes stronger. That is, where the S21 characteristics are larger, the sensitivity of the electromagnetic field probe 3600 becomes higher, and the electromagnetic field probe 3600 can sense an electromagnetic field with higher sensitivity.

In the case of a noise detection device that uses a magnetic field probe having a loop structure at the sensing end (see Patent Document 3, for example), if the sensing end is placed so as to be parallel to the longitudinal direction of the microstrip line 3600, the loop surface and the direction of a magnetic field generated from current become parallel to each other, and therefore, it becomes difficult to detect a noise component. In the case of the electromagnetic field probe 3600 according to this embodiment, on the other hand, even if the sensing end is placed so as to be parallel or perpendicular to the longitudinal direction of the microstrip line 3900, the S21 characteristics are large as shown in FIGS. 40 and 43, and electric field components generated from the microstrip line 3900 are detected.

Figure 44:
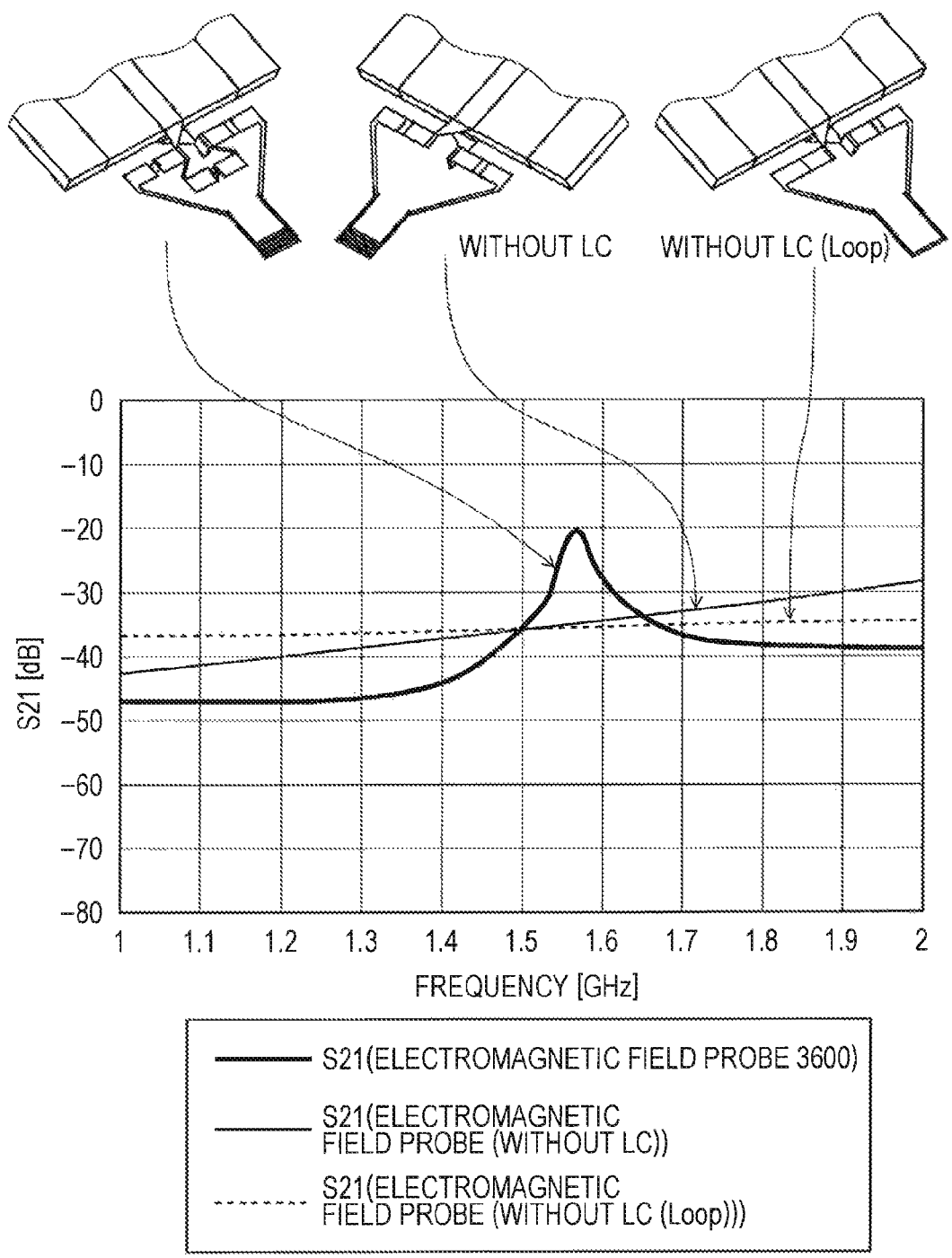
FIG. 44 is a diagram showing comparisons in the S21 characteristics among the electromagnetic field probe 3600, an electromagnetic field probe that has a short-circuited inductor portion and an opened capacitor portion, and an electromagnetic field probe than has a loop structure.

FIG. 44 shows comparisons among the results of S21 characteristics analyses conducted on the electromagnetic field probe 3600 shown in FIG. 38, an electromagnetic field probe (without LC) that has a short-circuited inductor portion and an opened capacitor portion, and an electromagnetic field probe (without LC (Loop)) that has two more comb-like electrodes 3611 and 3612 connected to form a loop structure. As can be seen from the drawing, the S21 characteristics of the electromagnetic field probe 3600 at the target frequency are at least 15 dB larger than those of the electromagnetic field probe "without LC" and the electromagnetic field probe "without LC (Loop)" that are supposed to detect electric field components and magnetic field components.

Figure 45:
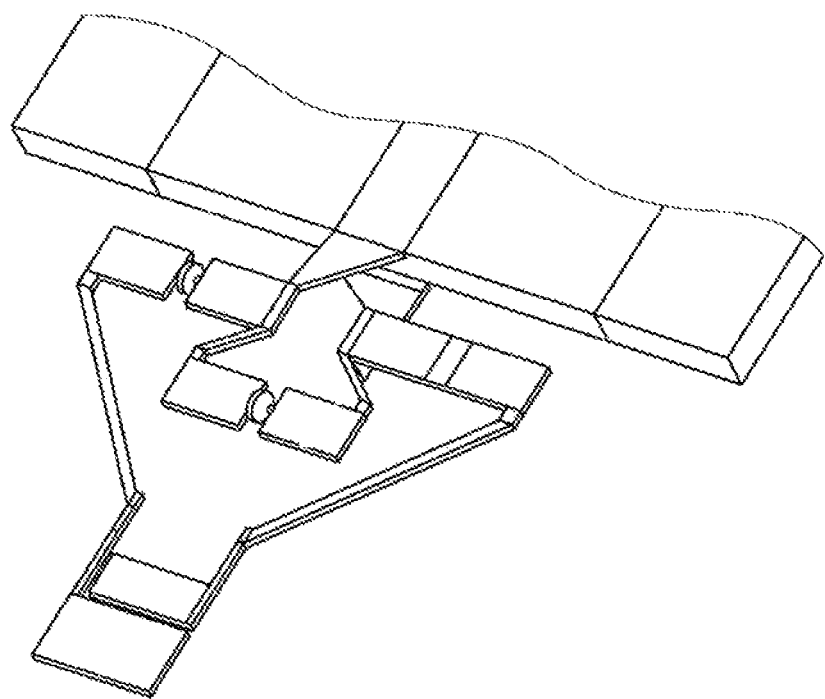
FIG. 45 is a diagram showing another example structure of the sensing end of an electromagnetic field probe.
Figure 46:
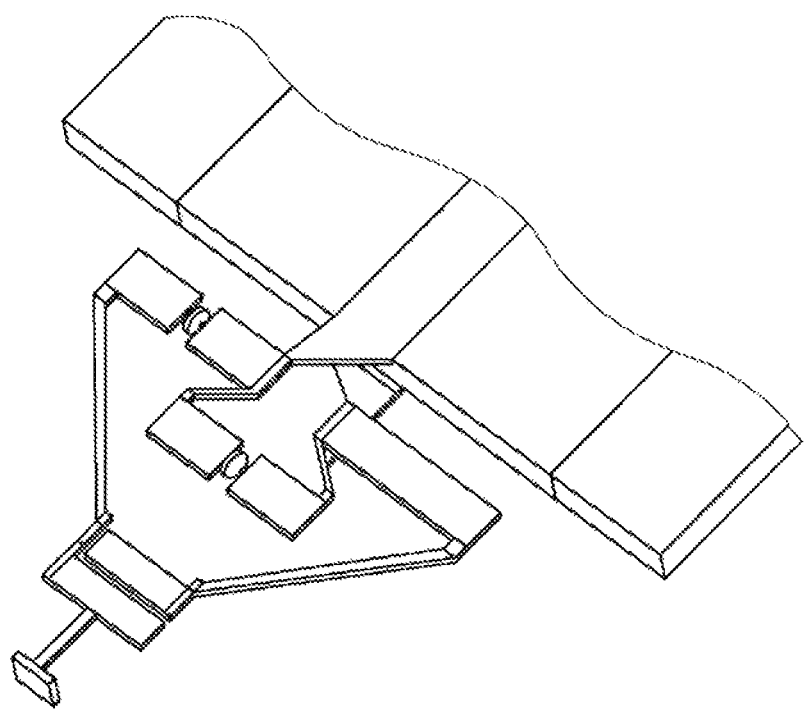
FIG. 46 is a diagram showing another example structure of the sensing end of an electromagnetic field probe.

The form of the sensing end of the electromagnetic field probe 3600 using electrodes having resonant structures is not limited to the two comb-like metal patterns shown in FIG. 38. FIGS. 45 and 46 show other example structures of the sensing ends of electromagnetic field probes (though the structures other than the electrode structures will not be described). In the example shown in FIG. 45, two flat-plate electrodes are placed at the sensing end. In the example shown in FIG. 46, a metal pad is provided so as to protrude from the outer electrode between two flat-plate electrodes, so that a local electric field can be more readily sensed. That is, the sensing end of an electromagnetic field probe should include two electrodes that are parallel to the measurement object surface, so as to sense a vertical electric field emitted from the measurement object.

The technology disclosed in this specification may be embodied in the structures described below.

(1) A field coupling electrode including: an electrode unit formed with a pair of electrode terminals; and a resonant circuit unit that makes a voltage V2 to be applied to the electrode unit higher than an input voltage V1.

(2) The field coupling electrode of (1), wherein the resonant circuit unit includes: a first resonant circuit connected in series to the electrode unit; and a second resonant circuit connected in parallel to the electrode unit and the first resonant circuit, which are connected in series.

(3) The field coupling electrode of (2), wherein the first resonant circuit includes at least one inductor, the second resonant circuit includes at least one inductor or capacitor, and the constant of the inductor or the capacitor included in the first resonant circuit and the second resonant circuit is set so as to maintain V2>V1 at a target frequency.

(4) The field coupling electrode of (2) wherein the resonant circuit unit further includes a capacitor connected in series to the electrode unit, and has a series resonant structure.

(5) A communication device including: an electrode unit formed with a pair of electrode terminals; a communication processing unit that processes a communication signal; and a resonant circuit unit that makes a voltage V2 to be applied to the electrode unit higher than a voltage to be output from the communication processing unit or a voltage V1 to be input to the communication processing unit.

(6) A communication system that conducts communication by a field coupling technique, with the electrode units of two communication devices facing each other via a communication path medium, each of the communication devices being the communication device of (5).

(7) The communication system of (6), wherein the communication path medium is a human body, a dielectric material, or a conductive material.

(8) A communication system that conducts communication by a field coupling technique, with the electrode units of two communication devices being placed at a short distance from each other, each of the communication devices being the communication device of (5).

(9) The communication system of (6) or (8), which is used for wireless power transmission.

(10) An electromagnetic field probe including: a sensing end to be brought close to a measurement object; and an electrode unit formed with two electrodes formed at the sensing end.

(11) The electromagnetic field probe of (10), further including at least one inductor connected in series to the electrode unit, wherein a resonant circuit is formed at a target frequency.

(12) The electromagnetic field probe of (10), further including: at least one inductor connected in series to the elect-rode unit; and at least one inductor or capacitor connected in parallel to the electrode unit and the at least one capacitor connected in series, wherein a resonant circuit is formed at a target frequency.

(13) The electromagnetic field probe of (11) or (12), wherein the inductor or the capacitor is formed with a substrate-mounted component, and the target frequency can be easily changed.

(14) A measurement device including the electromagnetic field probe of one of (10) through (13), wherein the measurement device brings the two electrodes of the sensing end close to the measurement object surface of the measurement object, and measures an electromagnetic field generated from the measurement object surface, the two electrodes being parallel to the measurement object surface.

CITATION LIST

Patent Documents

Patent Document 1: JP 2007-174570 A
Patent Document 2: WO 2009/123087 A1
Patent Document 3: JP 2012-13608 A

INDUSTRIAL APPLICABILITY

The technology disclosed in this specification has been described in detail, with reference to specific embodiments. However, it is obvious that those skilled in the art can make modifications to and substitutions of the embodiments without departing from the scope of the technology disclosed in this specification.

Although embodiments in which field coupling electrodes are used in communication devices for intra-body communication have been described in this specification, these embodiments can also be applied to short-range communication systems or wireless power transmission systems of a field coupling type. Also, a field coupling electrode can be used as an electromagnetic field probe for identifying a source of noise generation, a source of noise transmission, or a source of noise radiation, so as to cope with EMI or in-device interference.

In short, the technology disclosed in this specification has been described through examples, and the descriptions in this specification should not be interpreted in a restrictive manner. The claims should be taken into account in understanding the subject matter of the technology disclosed in this specification.

REFERENCE SIGNS LIST 100, 200 Communication device
110, 210 Electrode unit
111, 211 First electrode terminal
112, 212 Second electrode terminal
120, 220 Resonant circuit unit
121, 221 First resonant circuit
122, 222 Second resonant circuit
130, 230 Communication processing unit
1300, 2500 Substrate
1600 Communication device
1610 Electrode unit
1611 First electrode terminal
1612 Second electrode terminal
1620 Resonant circuit unit
1621 First resonant circuit
1622 Second resonant circuit
1630 Communication processing unit
2700 Communication device
2710 Electrode unit
2711 First electrode terminal
2712 Second electrode terminal
2720 Resonant circuit unit
2721 First resonant circuit
2722 Second resonant circuit
2730 Communication processing unit
3600 Electromagnetic field probe
3610 Electrode unit
3611 First electrode terminal
3612 Second electrode terminal
3620 Resonant circuit unit
3621 First resonant circuit
3622 Second resonant circuit
4801 Headphones
4902 Portable music player
4811, 4812 Electrode unit
4901 Notebook computer
4902 Mobile terminal
4911, 4912 Electrode unit

The invention claimed is:

1. A field coupling electrode comprising:
an electrode unit formed with a pair of electrode terminals;
a communication processing unit configured to process a communication signal; and
a resonant circuit unit configured to make an output voltage V2 higher than an input voltage V1 of the communication signal, the voltage V2 being applied to the electrode unit,
wherein the resonant circuit unit includes:
  a first resonant circuit connected in series to the electrode unit; and
  a second resonant circuit connected in parallel to the series connection between the electrode unit and the first resonant circuit,
wherein the first resonant circuit includes at least one inductor, the second resonant circuit includes at least one inductor or capacitor, and a constant of the at least one inductor of the first resonant circuit and a constant of the at least one inductor or capacitor of the second resonant circuit are set so as to maintain V2>V1 at a target frequency of the communication signal.

2. The field coupling electrode according to claim 1, wherein the resonant circuit unit further includes a capacitor connected in series to the electrode unit, and the series connection between the electrode unit and the capacitor provides a series resonant structure.

3. A communication system configured to conduct communication by a field coupling technique between a plurality of communication devices, each one of the plurality of communication devices comprising:
   an electrode unit formed with a pair of electrode terminals;
   a communication processing unit configured to process a communication signal; and
   a resonant circuit unit configured to make a voltage V2 higher than a voltage to be output from the communication processing unit or a voltage V1 to be input to the communication processing unit, the voltage V2 being to be applied to the electrode unit,
   wherein the resonant circuit unit of each communication device includes:
      a first resonant circuit connected in series to the electrode unit; and
      a second resonant circuit connected in parallel to the series connection between the electrode unit and the first resonant circuit, and
   wherein the electrode unit of a first communication device from among the plurality of communication devices faces the electrode unit of a second communication device from among the plurality of communication devices via a communication path medium in order to generate electric field components transmitted and received by respective ones of the first communication device and the second communication device.

4. The communication system according to claim 3, wherein the communication path medium is a human body, a dielectric material, or a conductive material.

5. The communication system of claim 3, wherein the generated electric field components are used for wireless power transmission.

6. A communication system configured to conduct communication by a field coupling technique between at least two communication devices, each one of the plurality of communication devices comprising:
   an electrode unit formed with a pair of electrode terminals;
   a communication processing unit configured to process a communication signal; and
   a resonant circuit unit configured to make a voltage V2 higher than a voltage to be output from the communication processing unit or a voltage V1 to be input to the communication processing unit, the voltage V2 being to be applied to the electrode unit,
   wherein the resonant circuit unit of each communication device includes:
      a first resonant circuit connected in series to the electrode unit; and
      a second resonant circuit connected in parallel to the series connection between the electrode unit and the first resonant circuit, and
   wherein the electrode units of the at least two communication devices are placed below a threshold distance from each other in order to transmit electric field components between the at least two communication devices.

7. The communication system of claim 6, wherein the transmitted electric field components are used for wireless power transmission.

* * * * *